(12) United States Patent
Takeuchi

(10) Patent No.: US 8,519,658 B2
(45) Date of Patent: Aug. 27, 2013

(54) ELECTROMECHANICAL DEVICE

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 319 days.

(21) Appl. No.: 13/086,495

(22) Filed: Apr. 14, 2011

(65) Prior Publication Data

US 2011/0291600 A1 Dec. 1, 2011

(30) Foreign Application Priority Data

May 26, 2010 (JP) .................................. 2010-120303

(51) Int. Cl.
*G05B 11/28* (2006.01)
(52) U.S. Cl.
USPC .......................................... 318/599; 318/811
(58) Field of Classification Search
USPC ...................... 318/599, 811, 459, 500, 400.34
See application file for complete search history.

(56) References Cited

U.S. PATENT DOCUMENTS

| | | | | |
|---|---|---|---|---|
| 6,472,845 B2 * | 10/2002 | Minagawa et al. | ........... | 318/801 |
| 6,515,443 B2 * | 2/2003 | Kelly et al. | ................... | 318/599 |
| 6,870,346 B2 * | 3/2005 | Davidov | ........................ | 318/685 |
| 7,230,401 B2 * | 6/2007 | Muroi et al. | .................. | 318/466 |
| 8,089,241 B2 | 1/2012 | Yamakawa et al. | | |

FOREIGN PATENT DOCUMENTS

| | | |
|---|---|---|
| JP | 09-056012 | 2/1997 |
| JP | 09-056013 | 2/1997 |
| JP | 2001-298982 | 10/2001 |
| JP | 2005-176529 | 6/2005 |
| JP | 2007-288818 | 11/2007 |
| JP | 2009-225633 | 10/2009 |

* cited by examiner

*Primary Examiner* — Rina Duda
(74) *Attorney, Agent, or Firm* — Harness, Dickey & Pierce, P.L.C.

(57) ABSTRACT

An electromechanical device includes: a magnet coil; a PWM driving circuit; and a control unit, wherein the control unit performs a first control of setting an excitation interval which is an interval in which a PWM drive signal is supplied to the magnet coil and a second control of changing a duty ratio of the PWM drive signal, and wherein the control unit performs an advance angle control of putting the phase of the center of the excitation interval earlier than the phase in which a counter-electromotive force generated in the magnet coil has the maximum value in the first control, and increases the duty ratio of the PWM drive signal in the second control so that a gain is greater than 100% when the gain is 100% at the time of generating the PWM drive signal so as to have a sinusoidal shape.

4 Claims, 27 Drawing Sheets

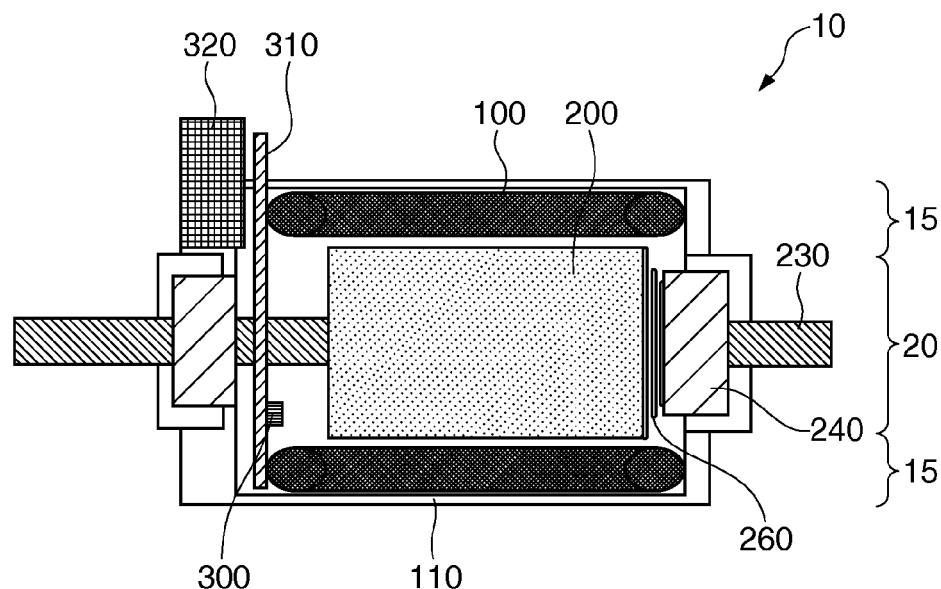
FIG. 1
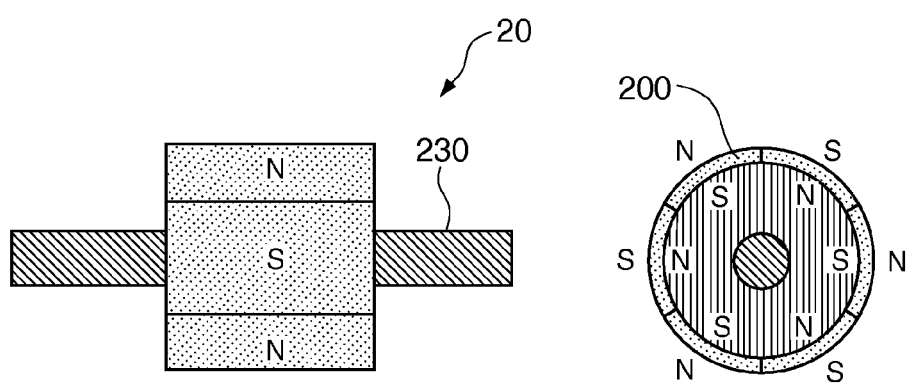
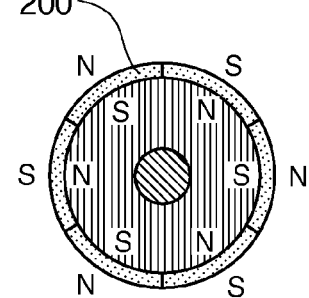
FIG. 2A        FIG. 2B

COUNTER-
ELECTROMOTIVE
FORCE WAVEFORM

WC CONTROL
WAVEFORM

PWM DRIVE
WAVEFORM
(ANALOG)

PWM DRIVE
WAVEFORM

WC CONTROL
WAVEFORM

PWM DRIVE
WAVEFORM
(ANALOG)

PWM DRIVE
WAVEFORM

COUNTER-
ELECTROMOTIVE
FORCE WAVEFORM

WC CONTROL
WAVEFORM

PWM DRIVE
WAVEFORM
(ANALOG)

PWM DRIVE
WAVEFORM
(HIGH VOLTAGE)

WC CONTROL
WAVEFORM
(LOW VOLTAGE)

WC CONTROL
WAVEFORM

PWM DRIVE
WAVEFORM
(ANALOG)

PWM DRIVE
WAVEFORM
(HIGH VOLTAGE)

PWM DRIVE
WAVEFORM
(LOW VOLTAGE)

FIG. 5A
COUNTER-
ELECTROMOTIVE
FORCE WAVEFORM
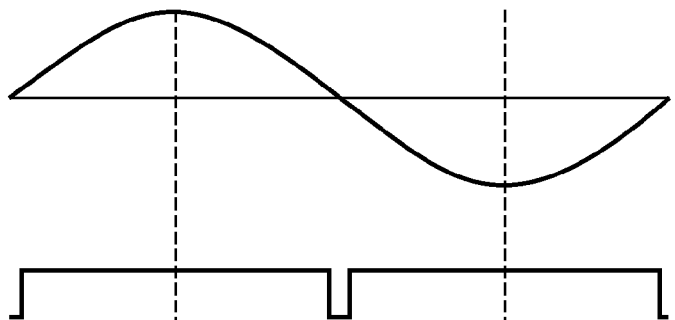
FIG. 5B
WC CONTROL
WAVEFORM
FIG. 5C
PWM DRIVE
WAVEFORM
(ANALOG)
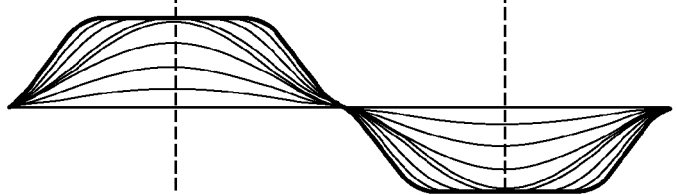
FIG. 5D
PWM DRIVE
WAVEFORM
(GAIN=100%)
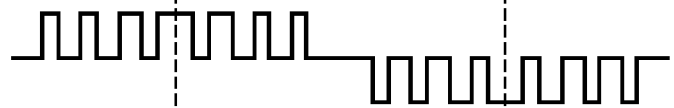
FIG. 5E
PWM DRIVE
WAVEFORM
(GAIN>100%)
FIG. 5F
PWM DRIVE
WAVEFORM
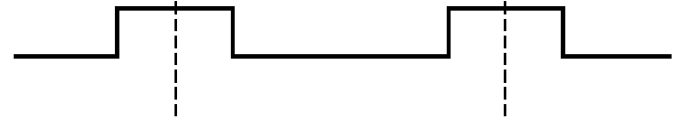
FIG. 5G
PWM DRIVE
WAVEFORM
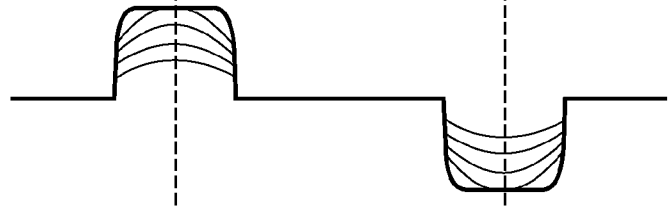

COUNTER-ELECTROMOTIVE FORCE WAVEFORM

ADVANCE ANGLE 0°

WC CONTROL WAVEFORM

PWM DRIVE WAVEFORM

CURRENT WAVEFORM

ADVANCE ANGLE 10°

WC CONTROL WAVEFORM

PWM DRIVE WAVEFORM

CURRENT WAVEFORM

ADVANCE ANGLE 20°

WC CONTROL WAVEFORM

PWM DRIVE WAVEFORM

CURRENT WAVEFORM

| PWM VALUE | WC CONTROLLER | ADVANCE ANGLE | ROTATION SPEED | CURRENT |
|---|---|---|---|---|
| PWM GAIN | WC RATIO | Ph | N | Ip |
| [%] | [%] | [2π/256] | [rpm] | [mA] |
| 100 | 6 | 0 | 1000 | 16.0 |
| | | 5 | 1070 | 17.5 |
| | | 10 | 1100 | 18.0 |
| | | 20 | 1200 | 21.0 |
| | | 30 | 1300 | 27.5 |
| 100 | 30 | 0 | 1000 | 18.0 |
| | | 5 | 1040 | 19.2 |
| | | 10 | 1100 | 22.5 |
| | | 20 | 1170 | 40.0 |
| | | 30 | 1250 | 87.0 |
| 100 | 80 | 0 | 1000 | 22.0 |
| | | 5 | 1040 | 19.5 |
| | | 10 | 1100 | 36.0 |
| | | 20 | 1140 | 104.0 |
| | | 30 | 1140 | 235.0 |

FIG. 9

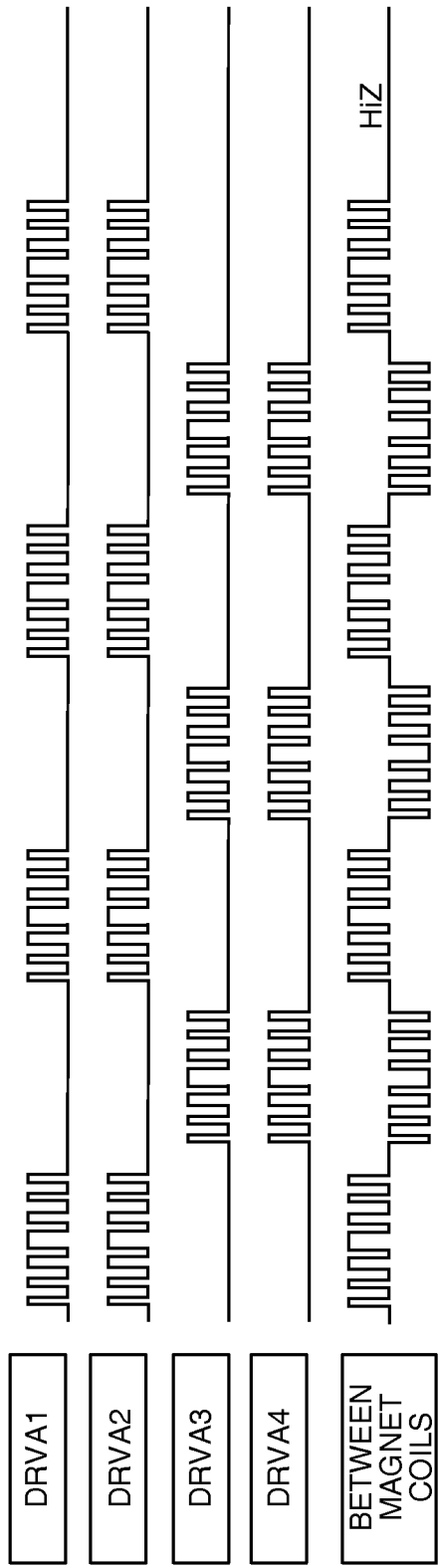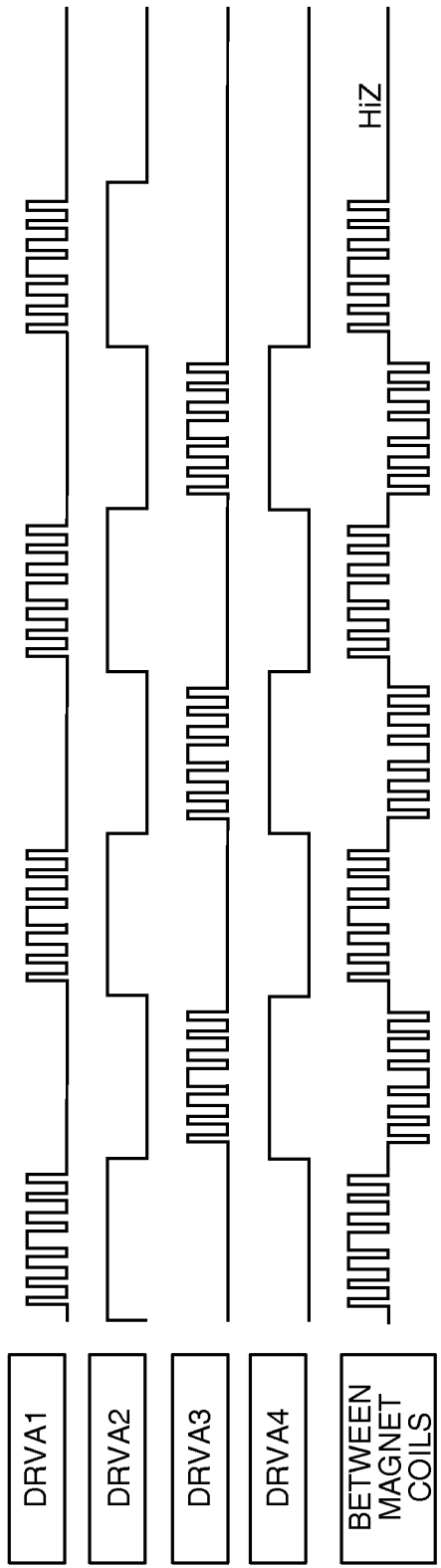

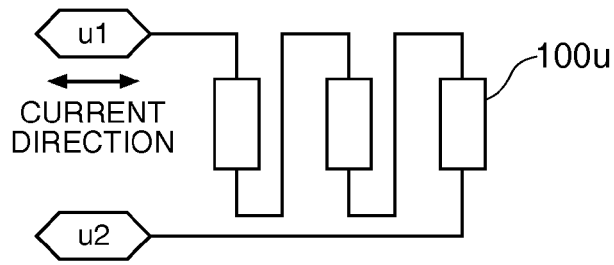
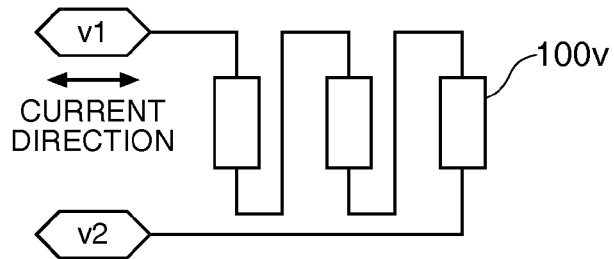
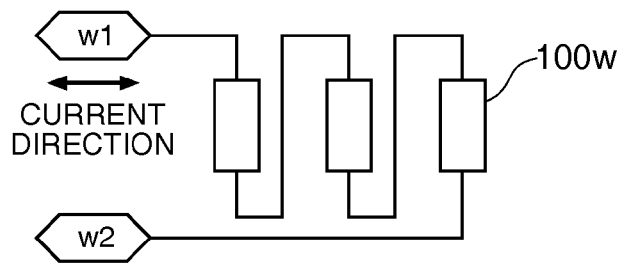
FIG. 21

ELECTROMECHANICAL DEVICE

BACKGROUND

1. Technical Field

The present invention relates to a technique of controlling an electromechanical device such as a motor or a power generator.

2. Related Art

For example, a motor described in JP-A-2001-298982 has been known.

In the motor, when a voltage applied to a magnet coil is lowered, a rotation speed-torque line moves to a low torque and a low rotation speed. That is, the rotation speed and the output torque are lowered. Accordingly, in order to rotationally drive the motor with a high torque or a high rotation speed, the voltage applied to the magnet coil has to be kept high. Particularly, when the motor is used in a moving machine such as a vehicle, a high voltage is applied to the magnet coil to rotationally drive the motor in a high-speed area, thereby increasing the power consumption of the motor. When the motor is used in a moving machine and is used as a regeneration brake at the time of reducing the speed, the moving machine may be excessively braked. These problems are common to various motors.

SUMMARY

An advantage of some aspects of the invention is to efficiently control an electromechanical device.

Application Example 1

This application example of the invention provides an electromechanical device including: a magnet coil; a PWM driving circuit that supplies a PWM drive signal to the magnet coil; and a control unit that controls the PWM driving circuit. Here, the control unit performs a first control of setting an excitation interval which is an interval in which the PWM drive signal is supplied to the magnet coil and a second control of changing a duty ratio of the PWM drive signal. The control unit performs an advance angle control of putting the phase of the center of the excitation interval earlier than the phase in which a counter-electromotive force generated in the magnet coil has the maximum value in the first control, and increases the duty ratio of the PWM drive signal in the second control so that a gain is greater than 100% when the gain is 100% at the time of generating the PWM drive signal so as to have a sinusoidal shape.

According to this application example, since the excitation interval is promoted in advance angle for drive in efficient phase and the gain is saturated to be greater than 100% in the excitation interval, it is possible to efficiently control the electromechanical device.

Application Example 2

This application example of the invention provides the electromechanical device according to the above application example, wherein the magnitude of an advance angle in the advance angle control is set to be greater as the length of the excitation interval becomes smaller.

According to this application example, the magnitude of the advance angle in the advance angle control is set to increase as the length of the excitation interval decreases, thereby efficiently driving the electromechanical device at a high rotation speed.

Application Example 3

This application example of the invention provides the electromechanical device according to Application Example 1 or 2, wherein the control unit performs a control of further narrowing the excitation interval in the first control as the electromechanical device operates at a higher speed.

In general, at the time of operating at a high speed, a high rotation speed is required rather than the large torque. According to this application example, by performing a control of narrowing the excitation interval, it is possible to realize a low torque and a high rotation speed.

Application Example 4

This application example of the invention provides the electromechanical device according to any one of Application Examples 1 to 3, wherein the control unit regenerates energy while performing a control of widening the excitation interval in the first control as the deceleration becomes higher at the time of decelerating the electromechanical device.

According to this application example, more energy can be regenerated as the deceleration increases.

The invention can be embodied in various forms. For example, the invention can be embodied as a control method of an electromechanical device, as well as the electromechanical device.

BRIEF DESCRIPTION OF THE DRAWINGS

The invention will be described with reference to the accompanying drawings, wherein like numbers reference like elements.

FIGS. 2A and 2B are diagrams illustrating the configuration of a rotor.

FIGS. 5A to 5G are diagrams illustrating the counter-electromotive force waveform, the control waveform, and the drive waveform of the motor when a gain is saturated.

FIG. 9 is a diagram illustrating the relation of an advance angle, a rotation speed, and a current.

FIGS. 20A and 20B are diagrams illustrating the ON and OFF of driving signals and the operation of the magnet coil.

FIG. 21 is a diagram illustrating the connection of the magnet coils in each phase.

DESCRIPTION OF EXEMPLARY EMBODIMENTS

First Embodiment

Figures 1, 2, 3, 6A, 6B, 6C, 6D:
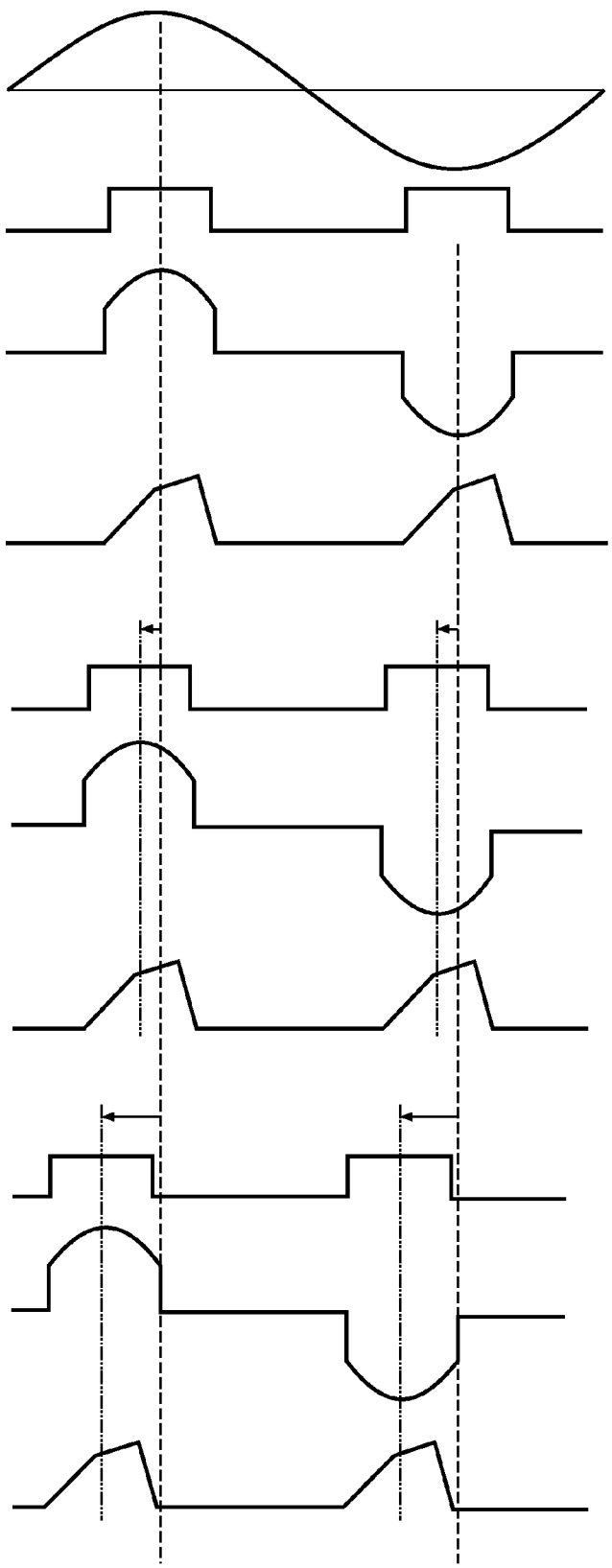
FIG. 1 is a diagram illustrating a motor according to a first embodiment of the invention.
FIGS. 6A to 6D-3 are diagrams illustrating the counter-electromotive force waveform, the control waveform, and the drive waveform of the motor when an advance angle control is performed.

FIG. 1 is a diagram illustrating a motor according to a first embodiment of the invention. A motor 10 is an inner-rotor motor with a radial gap structure in which a stator 15 having a substantially cylindrical shape is disposed in the outside and a rotor 20 having a substantially cylindrical shape is disposed in the inside. The stator 15 includes plural magnet coils 100 arranged along the inner circumference of a casing 110. The stator 15 further includes magnetic sensor 300 as a position sensor detecting a phase of the rotor 20. The magnetic sensor 300 is fixed to a circuit board 310 and the circuit board 310 is fixed to the casing 110. The circuit board 310 is connected to an external control circuit via a connector 320.

The rotor 20 includes a rotating shaft 230 at the center thereof and includes a permanent magnet 200 on the outer circumference thereof. The rotating shaft 230 is supported by a bearing 240 of the casing 110. The bearing 240 is formed of a non-conductive material. In this embodiment, a coil spring 260 is disposed inside the casing 110. The coil spring 260 positions the permanent magnet 200. However, the coil spring 260 may not be provided.

FIGS. 2A and 2B are diagrams illustrating the configuration of the rotor. FIG. 2A is a sectional view taken along a plane parallel to the rotating shaft 230 and FIG. 2B is a sectional view taken along a plane perpendicular to the rotating shaft 230. The rotor 20 includes six permanent magnets around the rotating shaft. The respective permanent magnets 200 are magnetized in a diameter direction directed from the center of the rotating shaft 230 to the outside (in the radiation direction). The permanent magnets 200 and the magnet coil 100 are disposed to face the opposed cylindrical surfaces of the rotor 20 and the stator 15.

Figure 3A:
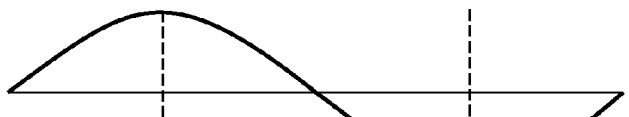
FIGS. 3A to 3G are diagrams illustrating a counter-electromotive force waveform, a control waveform, and a drive waveform of the motor.
Figure 3B:
Figure 3C:
Figure 3D:
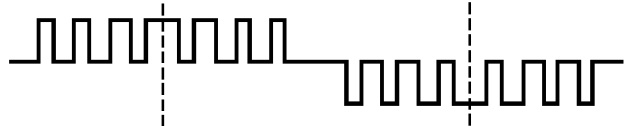

FIGS. 3A to 3G are diagrams illustrating a counter-electromotive force waveform, a control waveform, and a drive waveform of the motor. FIG. 3A shows the counter-electromotive force waveform of the motor 10. FIG. 3B shows an example of a WC control waveform used at the time of driving the motor 10. FIG. 3C shows a PWM drive waveform (analog) applied to the motor 10 when the WC control waveform is the same as shown in FIG. 3B. FIG. 3D schematically shows a PWM drive waveform (digital) applied to the motor 10 when the WC control waveform is the same as shown in FIG. 3B. As shown in FIG. 3A, the counter-electromotive force waveform is substantially sinusoidal. "WC" in FIG. 3B is an abbreviation of Window Comparator and the WC control waveform is a signal waveform indicating a period (window) through which the given magnet coil 100 (FIG. 1) is excited using a comparator. The center of an active period of the WC control waveform is the same as the phase in which the counter-electromotive waveform shown in FIG. 3A has the maximum value. As shown in FIG. 3B, the WC control waveform is zero in the phase in which the counter-electromotive force waveform shown in FIG. 3A is substantially zero. Accordingly, the analog PWM drive waveform shown in FIG. 3C is substantially zero in the phase in which the counter-electromotive force waveform shown in FIG. 3A is substantially zero.

Figure 3E:
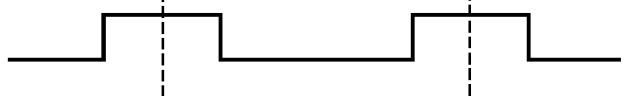
Figure 3F:
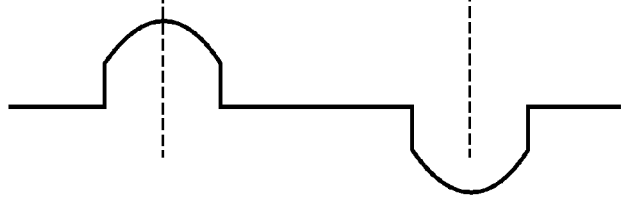
Figure 3G:
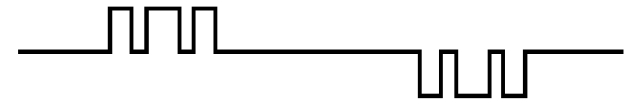

FIG. 3E shows a waveform in which the active period of the WC control waveform shown in FIG. 3B is narrowed. FIG. 3F shows a PWM drive waveform (analog) applied to the motor 10 when the WC control waveform is the same as shown in FIG. 3E. FIG. 3G schematically shows a PWM drive waveform (digital) applied to the motor 10 when the WC control waveform is the same as shown in FIG. 3E. The PWM drive waveform shown in FIG. 3F is zero when the WC control waveform is inactive. As can be seen from the comparison result of FIGS. 3D and 3F, the number of pulses decreases as the active period of the WC control waveform becomes shorter.

Figure 4A:
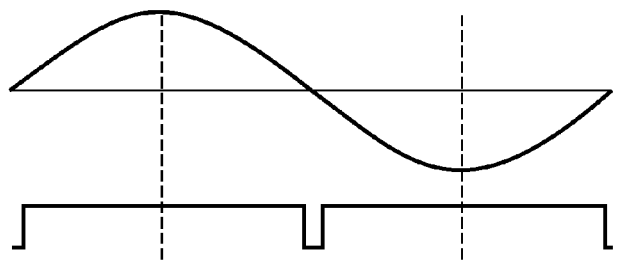
FIGS. 4A to 4I are diagrams illustrating the counter-electromotive force waveform, the control waveform, and the drive waveform of the motor when a duty ratio is changed.
Figure 4B:
Figure 4C:
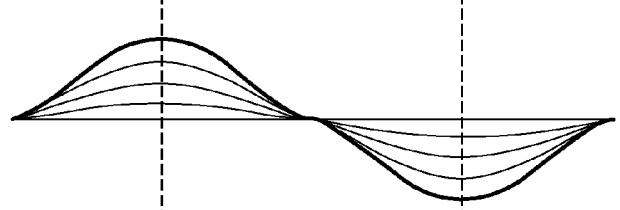
Figure 4D:
Figure 4E:
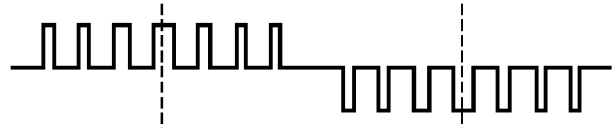

FIGS. 4A to 4G is a diagram illustrating a counter-electromotive force waveform, a control waveform, and a drive waveform of the motor when the duty ration is changed. FIG. 4A shows a counter-electromotive force waveform of the motor 10. FIG. 4B shows an example of a WC control waveform used at the time of driving the motor 10. FIGS. 4A and 4B are similar to FIGS. 3A and 3B. FIG. 4C shows a PWM drive waveform (analog) applied to the motor 10 when the WC control waveform is the same as shown in FIG. 4B. Here, the thick line indicates the PWM drive waveform of a sine wave of which the gain is equal to 100 and the thin lines indicate the PWM drive waveforms of which the gain is less than 100% and the duty ratio is lower than the duty ratio of the sine wave. FIGS. 4D and 4E show PWM drive waveforms (digital) corresponding to the thick line and the thin lines in FIG. 4C. As can be seen from the comparison of FIGS. 4D and 4E, in FIGS. 4D and 4E, the number of pulses representing an active period is the same but the width of the corresponding pulses is smaller in FIG. 4E. When the duty ratio is lowered, the duty ratios of thin pulses of which the widths are smaller than a predetermined value may be set to zero and may thus be removed. FIGS. 4F to 4I correspond to FIGS. 4B to 4E, where the active periods of the WC control waveforms are set to be shorter than the active periods of the WC control waveforms shown in FIGS. 4B to 4E.

FIGS. 5A to 5G are diagrams illustrating a counter-electromotive force waveform, a control waveform, and a drive waveform of the motor when the gain is saturated. FIG. 5A shows a counter-electromotive force waveform of the motor 10. FIG. 5B shows an example of a WC control waveform used at the time of driving the motor 10. FIGS. 5A and 5B are similar to FIGS. 3A and 3B. The gain is an index number indicating the length of the active period of the PWM drive waveform. In this embodiment, the gain is expressed by (active period of PWM drive signal)/(WC active period) and is set to 100% when the PWM drive waveform is sinusoidal. When the duty ratio is lower than the duty ratio of the sine wave, the gain is less than 100%. When the duty ratio is higher than the duty ratio of the sine wave, the gain is greater than 100%. When the gain is greater than 100%, the gain is saturated to approach a rectangular waveform. FIG. 5C shows PWM drive waveforms (analog) when the gain has various values. FIG. 5D shows a PWM drive waveform (digital) with a gain of 100% and FIG. 5E shows a PWM drive waveform (digital) with a grain greater than 100%. As can be seen from the comparison of FIGS. 5D and 5E, the number of pulses indicating the active period is the same but the width of the corresponding pulse width is greater in FIG. 5E. FIG. 5F shows a waveform in which the active period of the WC control waveform is narrowed. FIG. 5G shows a PWM drive waveform (analog) applied to the motor 10 when the WC control waveform is the same as shown in FIG. 5E. In FIG. 5G, the thick line indicates a waveform with a gain greater than 100%.

Figure 4F:
Figure 4G:
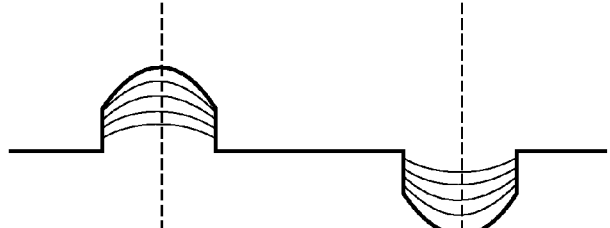
Figure 4H:
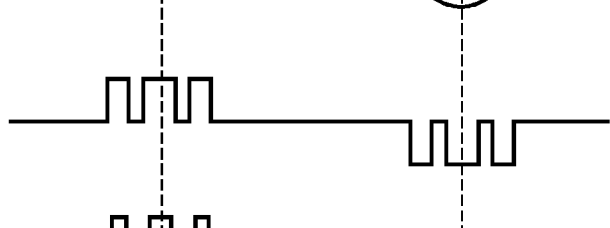
Figure 4I:
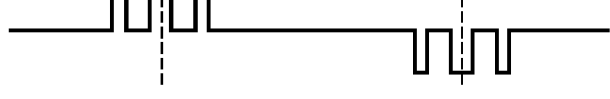

FIGS. 6A to 6D-3 are diagrams illustrating a counter-electromotive force waveform, a control waveform, and a drive waveform of the motor when an advance angle control is performed. Here, the width of the WC control waveform is narrowed as shown in FIG. 3E, FIG. 4F, and FIG. 5F. FIG. 6A shows a counter-electromotive force waveform of the motor 10. FIG. 6B shows a WC control waveform (B-1), a PWM drive waveform (B-2), and a current waveform (B-3) when an advance angle is 0°. Similarly, FIGS. 6C and 6D show WC control waveforms, PWM drive waveforms, and current waveforms when an advance angle is 10° and 20°. As described above, a control using an advance angle as well as the control (the first control) using the width of WC control waveform and the control (the second control) using the duty ratio can be performed in controlling the motor 10.

Figure 7:
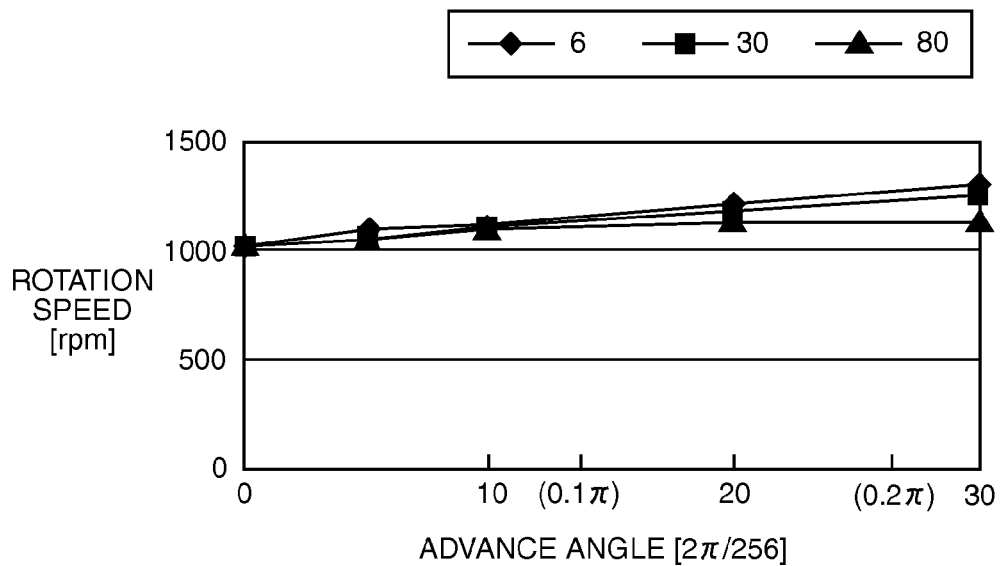
FIG. 7 is a diagram illustrating the relation of an advance angle and a rotation speed.
Figure 8:
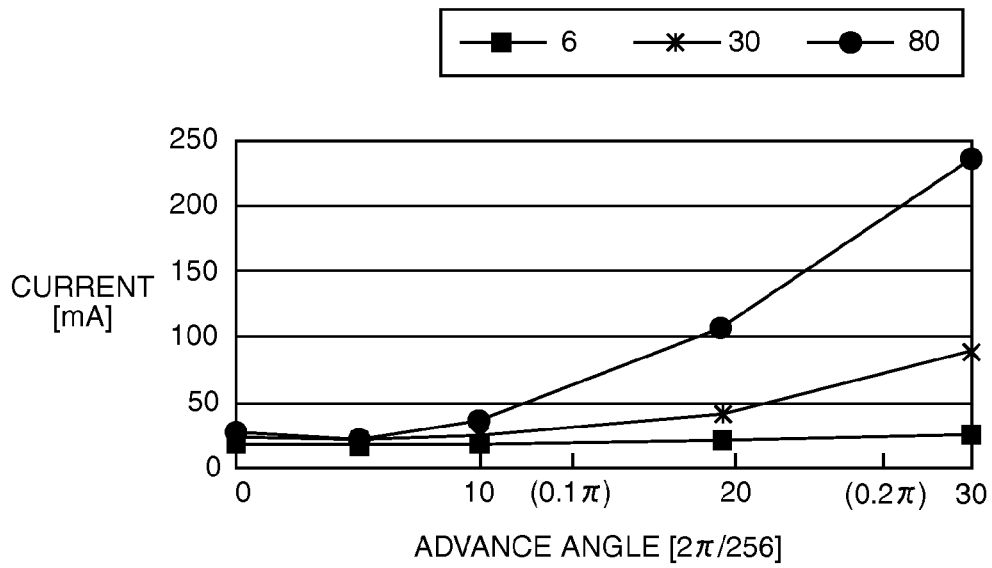
FIG. 8 is a diagram illustrating the relation of an advance angle and a current.

FIG. 7 is a diagram illustrating the relation of the advance angle and the rotation speed. FIG. 8 is a diagram illustrating the relation of the advance angle and the current. FIG. 9 is a diagram illustrating the relation of the advance angle, the rotation speed, and the current. FIGS. 7 and 8 are graphs obtained from the data shown in FIG. 9. In FIGS. 7 to 9, the WC control width is set to three steps of 6%, 30%, and 80% with respect to π as 100% (normally driven). For each WC control width, the duty ratio is adjusted so that the PWM drive waveform is sinusoidal. A PWM drive voltage is adjusted so that the rotation speed of the motor 10 is 1000 rpm at the advance angle of 0° for each WC control width.

As can be seen from FIG. 7, when the advance angle is promoted, the rotation speed of the motor 10 increases. The rotation speed increases greater as the WC control width becomes smaller. The reason is as follows. When the advance angle is promoted with a small WC control width, the phases in which drive power is applied advance before and after without overlapping. When advance angle is promoted with a great WC control width, the most phases in which the drive power is applied overlap before and after. Accordingly, it is difficult to exhibit the effect of the advance angle. As can be seen from FIG. 8, when the advance angle is promoted with a small WC control width, the increase in current is small. On the other hand, when the advance angle is promoted with a great WC control width, the current rapidly increases. Accordingly, when the WC control width is set to 6% and the advance angle is promoted, the rotation speed of the motor 10 can be enhanced by about 30% without largely increasing the current. That is, it is possible to rotate the motor 10 at a high speed.

Figure 10A:
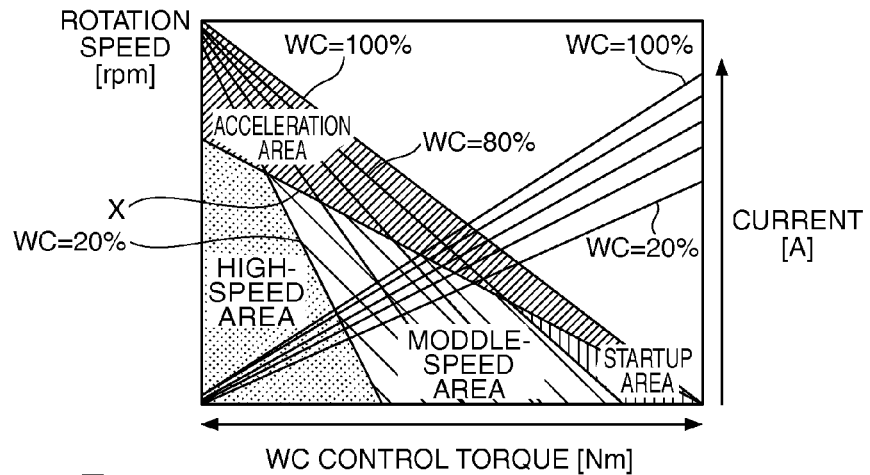
FIGS. 10A to 10D are diagrams illustrating an operation table of the motor based on a T-N characteristic.

FIG. 10A is a diagram illustrating an operation table of the motor based on a T-N characteristic. The downward-sloping lines represent the relation between the torque and the rotation speed. The lines represent the T-N characteristic every 20% with a WC control width stepwise varying from 100% to 20%. The slowest downward-sloping line X is used to distinguish an acceleration area and does not represent the T-N characteristic. The area on the left side of the line with a WC control width of 20% is a high-speed area. That is, when the motor 10 is used for a moving machine such as an electrical vehicle or an electrical train, the high-speed area is used for the electrical vehicle or the electrical train to move at a high speed. The area located on the right side of the line with a WC control width of 20% and on the left side of the line with a WC control width of 80% is a middle-speed area. The area on the right side of the line with a WC control width of 80% is a startup area (or a low-speed area). Regardless of the high-speed area, the middle-speed area, and the startup area, the area above the line X is an acceleration area. For example, the area on the left side of the line with a WC control width of 20% and above the line X is a high-speed area and a control area for acceleration. The area on the right side of the line with a WC control width of 80% and below the line X is a startup area. In general, when the electrical vehicle or the electrical train starts up from a speed of 0 in the area and the speed thereof increases (the rotation speed increases), it goes to the acceleration area.

The upward-sloping lines represent the relation of the torque and the current. Similarly to the T-N characteristic, the lines represent the characteristic every 20% with a WC control width stepwise varying from 100% to 20%.

Figure 10B:
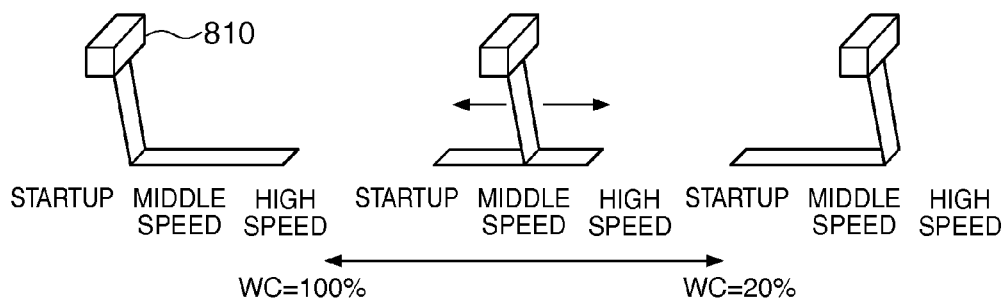

FIG. 10B shows a torque-changing operation lever 810 switching the operation area to the high-speed area, the middle-speed area, and the startup area. The torque-changing operation lever 810 corresponds to a selection lever in an automatic-transmission vehicle or a shift knob in a manual-transmission vehicle. For example, when the torque-changing operation lever 810 corresponds to the selection lever of the automatic-transmission vehicle, the position of startup area corresponds to a low range "L" or a first range "1", the position of the middle-speed area corresponds to a second range "S" or a second range "2", and the position of the high-speed area corresponds to a drive range "D". Since the automatic transmission increases in stages, it may also be thought that the position of the middle-speed area corresponds to the drive range "D" and the position of the high-speed area corresponds to an over-drive (or over-top) range "OD".

Figure 10C:
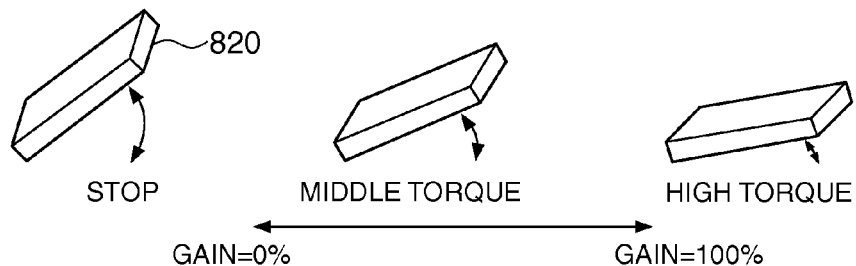

FIG. 10C shows an accelerator pedal 820. The accelerator pedal 820 controls the duty ratio of the motor 10. That is, when the gap of the accelerator pedal 820 increases, the duty ratio (gain) increases and the torque increases. In the example shown in FIG. 10C, the gain is set to 100%, but the gain may be set to be greater than 100%.

Figure 10D:
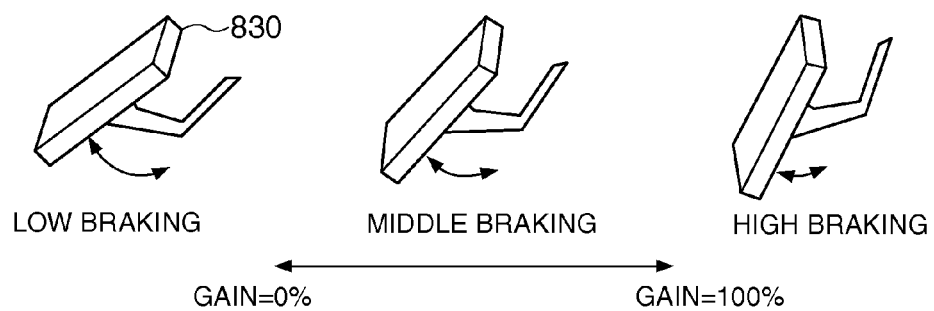

FIG. 10D shows a brake pedal 830. The brake pedal is used to brake the electrical vehicle or the electrical train. In this embodiment, the brake pedal 830 is made to interlock with the duty ratio (gain). That is, when a brake-pedaling force on the brake pedal 830 is strong (high braking), the duty ratio is set to be high to regenerate more kinetic energy into electric energy. On the other hand, when the brake-pedaling force is weak (low braking), the duty ratio is set to be low to reduce the amount of kinetic energy regenerated. When the amount of kinetic energy regenerated is great with a weak brake-pedaling force, the regenerative braking power by the motor 10 is too strong, thereby giving an unpleasant feeling to a driver.

By changing the WC control width by the use of the torque-changing operation lever 810, the kinetic energy may be regenerated at the time of braking. When the torque-changing operation lever 810 is located at the startup position, the WC control width may be set to be great to increase the amount of kinetic energy regenerated. In this case, the regenerative braking power increases. That is, a strong engine brake is applied to a vehicle. On the other hand, when the torque-changing operation lever 810 is located at the high-speed position, the WC control width may be set to be small to decrease the amount of kinetic energy regenerated. In this case, the regenerative braking power is not great.

Figure 11:
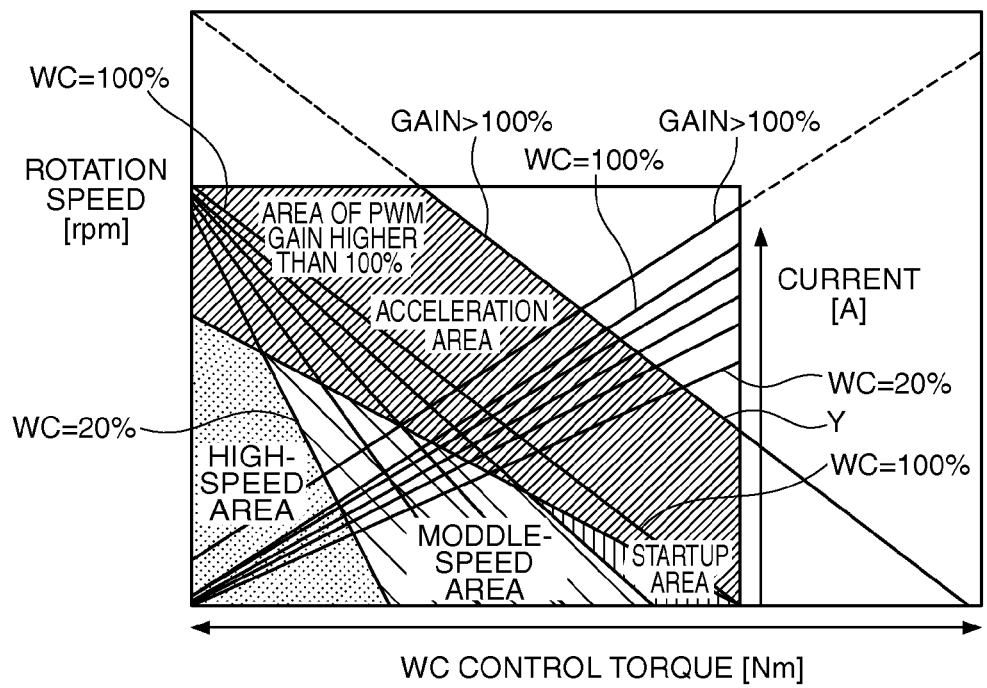
FIG. 11 is a diagram illustrating an operation table of the motor based on a T-N characteristic which includes a case where a gain is greater than 100%.

FIG. 11 is a diagram illustrating an operation table of the motor based on the T-N characteristic which includes a case where the gain is greater than 100%. In this embodiment, when the duty ratio of the PWM drive waveform is equal to the duty ratio of a sine wave in the period of the WC control width, the gain is set to 100%. The state where the gain is greater than 100% is a state (saturated state) where the duty ratio is greater than the duty ratio of the sine wave in the period of the WC control width. The graph representing the T-N characteristic in this case moves to the upper-right side. The line Y shown in FIG. 11 represents the T-N characteristic with a duty ratio of 100%. When the duty ratio cannot be greater than 100%, the area on the upper-right side of the line Y is a non-operable area. The operating point with a gain greater than 100% is located in the area on the lower-left side of the line Y and on the upper-right side of the T-N characteristic line corresponding to the WC control width thereof, and is mainly included in the acceleration area.

Figure 12:
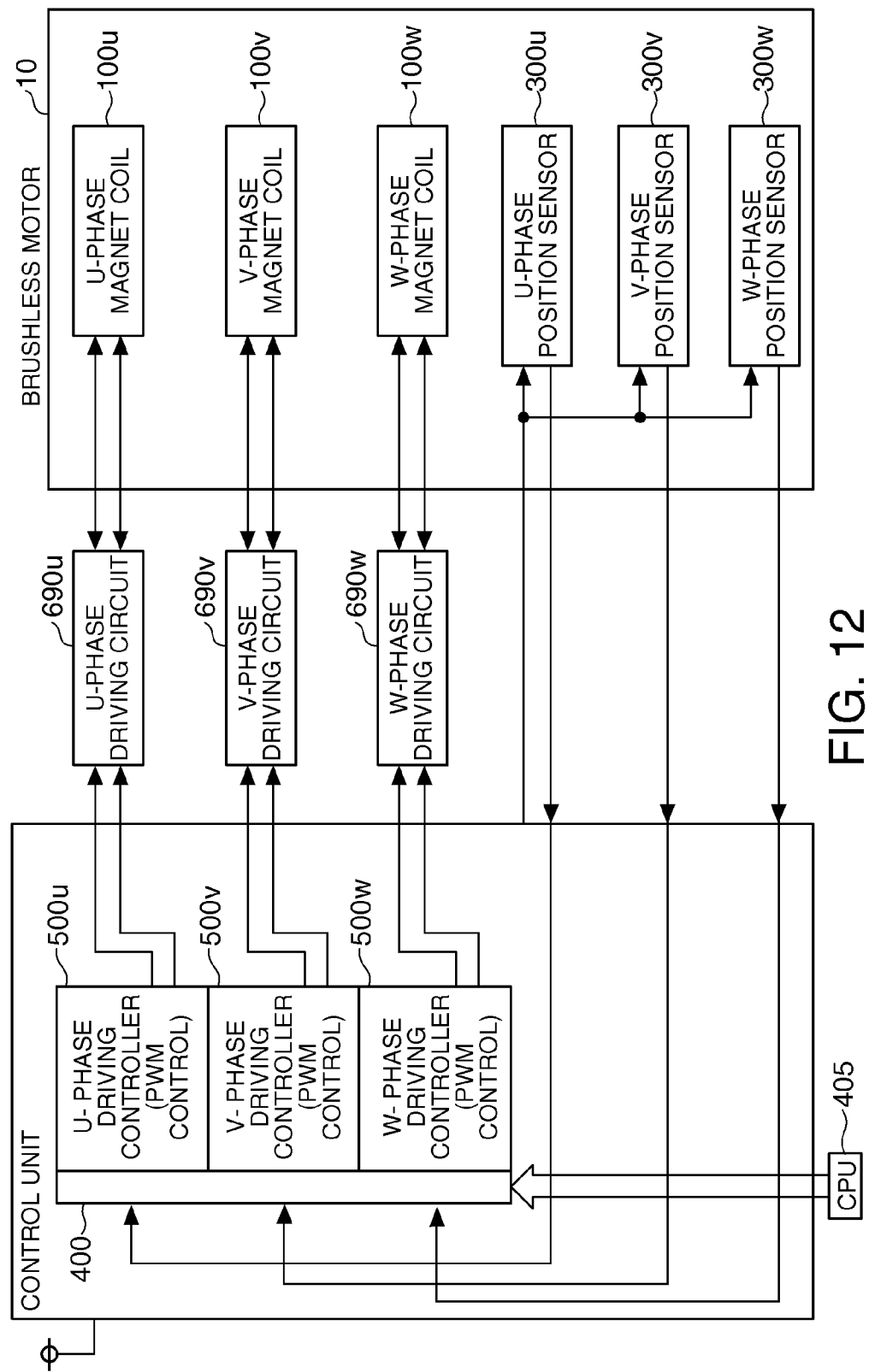
FIG. 12 is a block diagram illustrating a control circuit of the motor according to the first embodiment.

FIG. 12 is a diagram illustrating the configuration of a control circuit block of the motor according to this embodiment. Here, it is assumed that the motor 10 is a three-phase motor in which the phases are connected independently of each other without using a star connection or a delta connection. The control circuit block includes a PWM controller 400, a CPU 405, and a U-phase driving circuit 690u, a V-phase driving circuit 690v, and a W-phase driving circuit 690w. The PWM controller 400 includes a U-phase driving controller 500u to a W-phase driving controller 500w. The U-phase driving circuit 690u receives a control signal from the U-phase driving controller 500u and drives a U-phase magnet coil 100u of the brushless motor 10. The brushless motor 10 includes a U-phase sensor 300u. The PWM controller 400 receives a position signal from the U-phase sensor 300u and performs a control. The same is true of the V-phase and W-phase controls.

Figure 13:
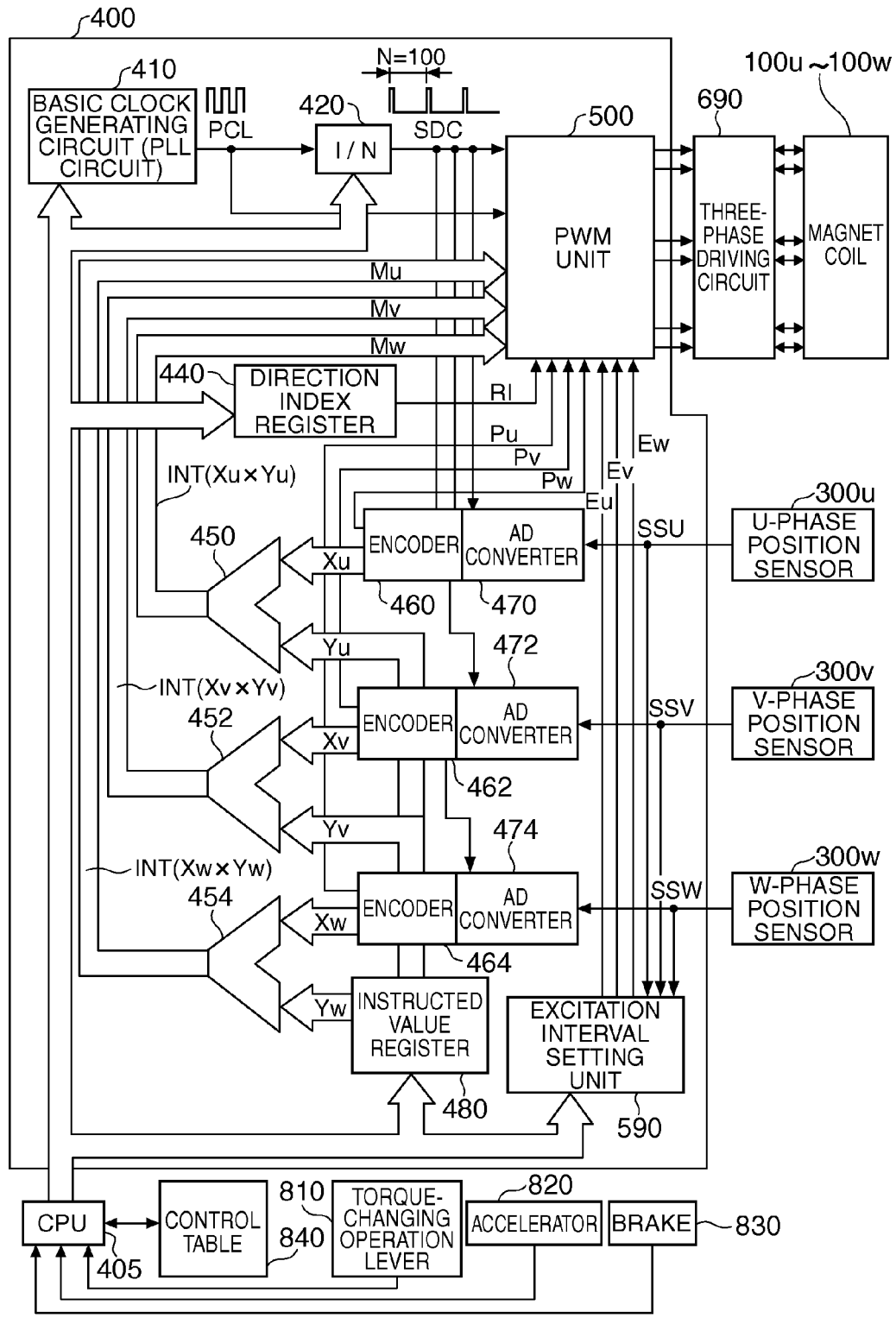
FIG. 13 is a block diagram illustrating an example of the internal configuration of a PWM controller.

FIG. 13 is a diagram illustrating an example of the internal configuration of the PWM controller. The PWM controller 400 or the CPU 405 may be disposed on the circuit board 310 (FIG. 1) or may be disposed in an external circuit connected thereto by the connector 320 (FIG. 1). The PWM controller 400 includes a basic clock generating circuit 410, a 1/N divider 420, a PWM unit 500, a direction index register 440, multipliers 450, 452, and 454, encoders 460, 462, and 464, AD converters 470, 472, and 474, an instructed voltage value register 480, and an excitation interval setting unit 590. The U-phase driving controller 500u in the block diagram shown in FIG. 12 includes the multiplier 450, the encoder 460, the AD converter 470, and the controller involved in the U-phase driving in the PWM unit 500 in FIG. 13. The same is true of the V-phase driving controller 500v and the W-phase driving controller 500w.

The basic clock generating circuit 410 is a circuit generating a clock signal PCL of a predetermined frequency and includes, for example, a PLL circuit. The divider 420 generates a clock signal SDC of 1/N times the frequency of the clock signal PCL. The value of N is set to a predetermined value. The value of N is set for the divider 420 in advance by the CPU 405. The PWM unit 500 generates drive signal of u, v, and w phases on the basis of the clock signals PCL and SDC, the multiplied values Mu, Mv, and Mw supplied from the multipliers 450, 452, and 454, the direction index RI supplied from the direction index register 440, the sign index signals Pu, Pv, and Pw supplied from the encoders 460, 462, and 464, and the excitation interval signals Eu, Ev, and Ew supplied from the excitation interval setting unit 590. This operation will be described later.

In the direction index register 440, the direction index RI indicating the rotation direction of the motor is set by the CPU 405. In this embodiment, the motor normally rotates when the direction index RI is at a L level, and reversely rotates when the direction index RI is at a H level.

The values Mu, Mv, Mw, Pu, Pv, Pw, Eu, Ev, Ew of the signals supplied to the PWM unit 500 are determined as follows. The multiplier 450, the encoder 460, and the AD converter 470 are U-phase circuits, the multiplier 452, the encoder 462, and the AD converter 472 are V-phase circuits, and the multiplier 454, the encoder 464, and the AD converter 474 are W-phase circuits. The operations of the circuit groups are the same and thus the operation of the U-phase circuits will be mainly described below.

The output SSU of the magnetic sensor is supplied to the AD converter 470. The range of the sensor output SSU is, for example, from GND (ground potential) to VDD (source voltage) and the median point (=VDD/2) thereof is a median point (point corresponding to the origin of a sine wave) of an output waveform. The AD converter 470 AD-converts the sensor output SSU and generates a digital value of the sensor output. The output range of the AD converter 470 is, for example, from FFh to 0h (where "h" represents a hexadecimal) and the median value 80h corresponds to the median point of the sensor waveform.

The encoder 460 sets the value of the median point of the sensor output to 0 by changing the range of the sensor output after the AD conversion. As a result, the sensor output Xu generated by the encoder 460 has a value in a predetermined plus range (for example, +127 to 0) and a predetermined minus range (for example, 0 to −128). However, the absolute value of the sensor output value Xu is supplied from the encoder 460 to the multiplier 450 and the plus-minus sign is supplied as a sign signal Pu to the PWM unit 500.

The instructed voltage value register 480 stores an instructed voltage value Yu set by the CPU 405. The instructed voltage value Yu serves as a value for setting a voltage applied to the motor along with the excitation interval signal Eu to be described later, and has, for example, a value in the range of 0 to 1.0. When the excitation interval signal Eu is set so as not to provide a non-excitation interval and to set the overall interval to the excitation interval, Yu=0 means that the applied voltage is zero and Yu=1.0 means that the applied voltage is the maximum value. The multiplier 450 multiplies the instructed voltage value Yu by the sensor output value Xu output from the encoder 460 and gets an integer value, and supplies the multiplied value Mu to the PWM unit 500. The output of the PWM unit 500 is input to the three-phase driving circuit 690, whereby the magnet coils 100u to 100w are driven.

The control signals from the torque-changing operation lever 810, the accelerator pedal 820, and the brake pedal 830 are input to the CPU 405. A control table 840 is connected to the CPU 405. The CPU 405 determines the width and the advance angle of the excitation interval signal Eu with reference to the control table 840 on the basis of the control signals (pedaling amount) from the torque-changing operation lever 810, the accelerator pedal 820, and the brake pedal 830, and outputs the excitation interval signal Eu. The control table 840 is preferably set so that the advance angle of the excitation interval signal Eu is promoted earlier as the width of the excitation interval signal Eu becomes smaller. The relation of the pedaling amounts of the accelerator pedal 820 and the brake pedal 830 and the adjustment amount of the width and the advance angle of the excitation interval signal Eu is determined in advance by experiments or experience. However, the control table 840 may be set to adjust only one of the width and the advance angle of the excitation interval signal Eu.

Figure 14:
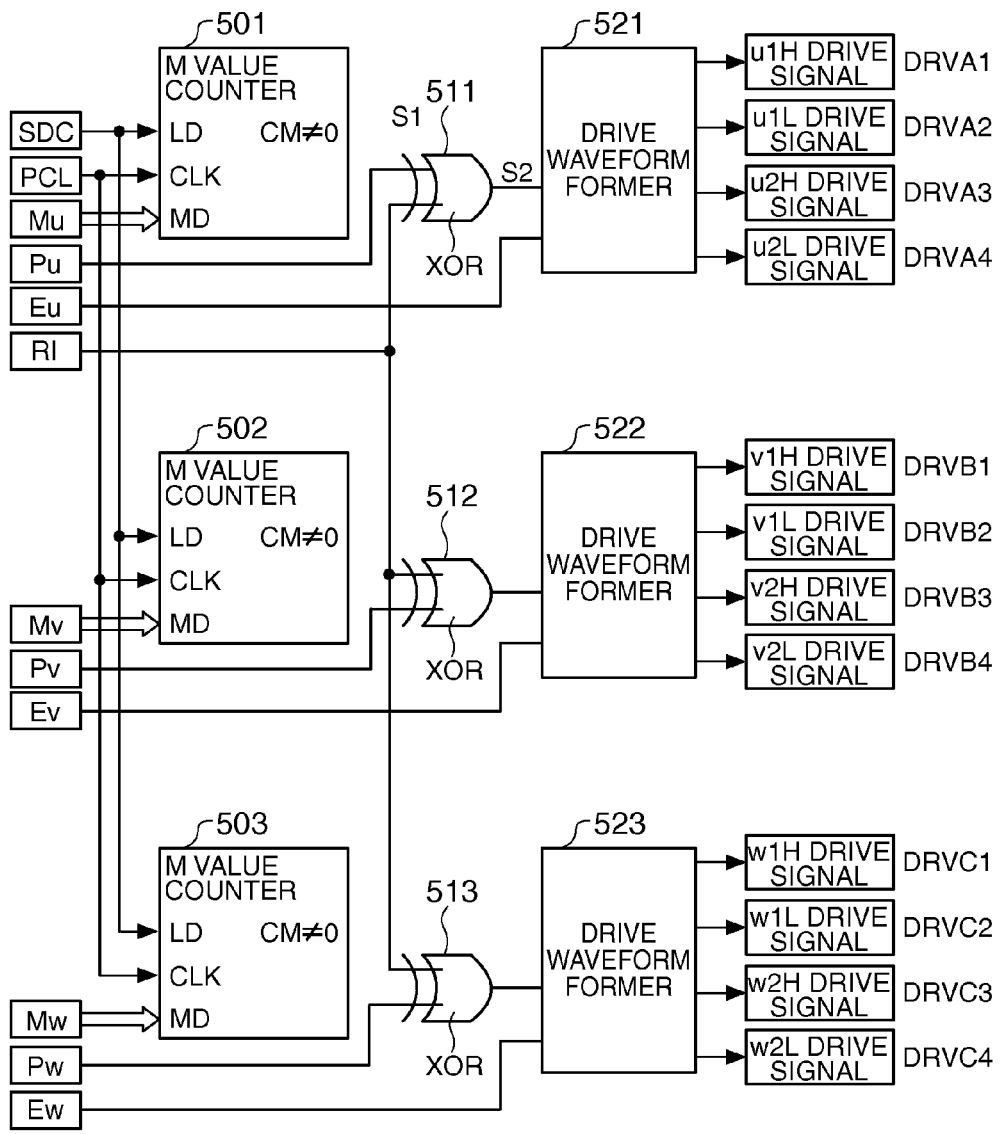
FIG. 14 is a block diagram illustrating an example of the internal configuration of a PWM unit (FIG. 13).

FIG. 14 is a block diagram illustrating the internal configuration of the PWM unit 500 (see FIG. 13). The PWM unit 500 includes counters 501, 502, and 503, EXOR circuits 511, 512, and 513, and drive waveform formers 521, 522, and 523. The counter 501, the EXOR circuit 511, and the drive waveform former 521 are U-phase circuits, the counter 502, the EXOR circuit 512, and the drive waveform former 522 are V-phase circuits, and the counter 503, the EXOR circuit 513, and the drive waveform former 523 are W-phase circuits. The operations of these circuits will be described below with reference to a timing diagram.

Figure 15:
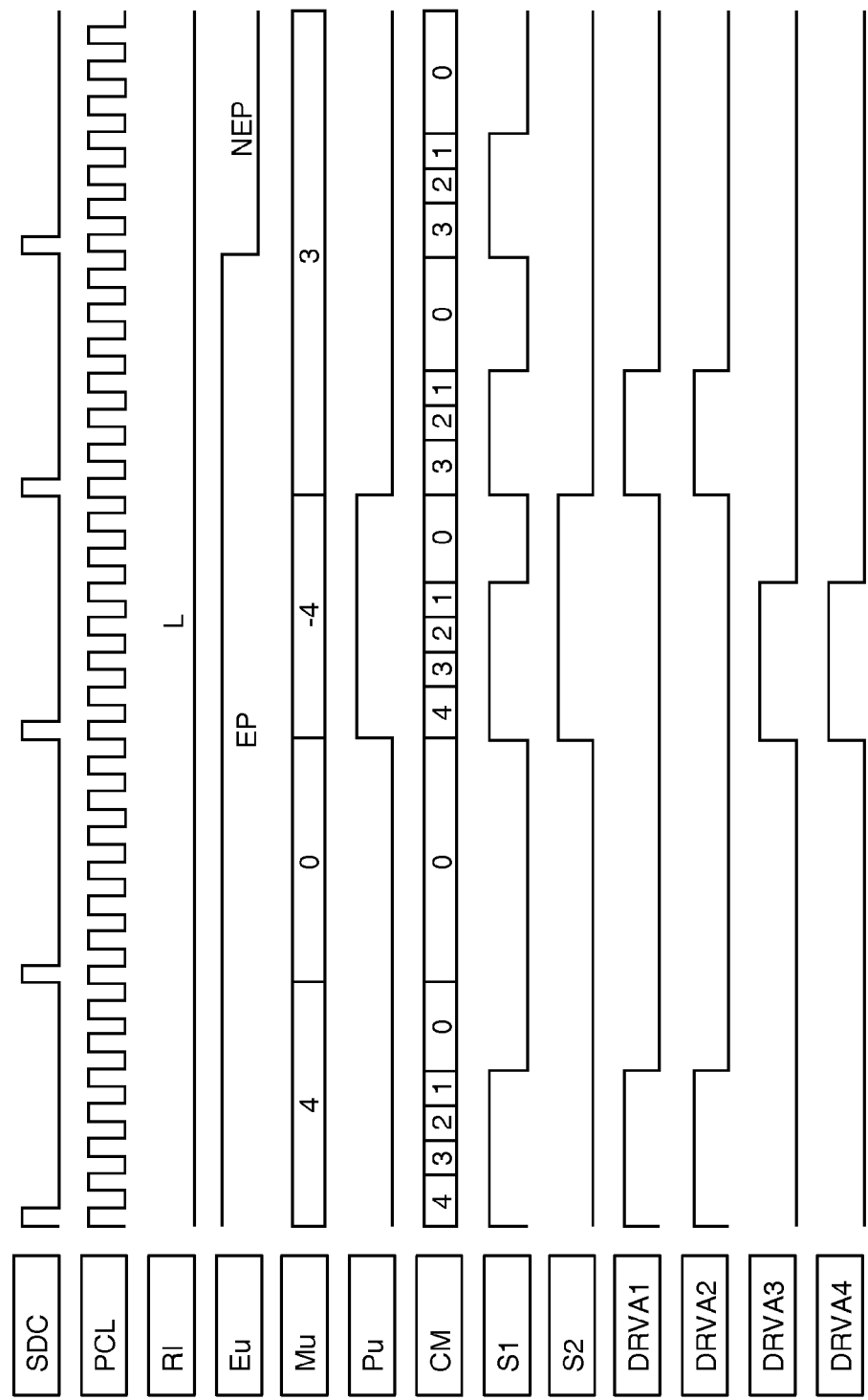
FIG. 15 is a timing diagram illustrating the operation of the PWM unit at the time of the normal rotation of the motor.

FIG. 15 is a timing diagram illustrating the operation of the PWM unit 500 at the time of the normal rotation of the motor. Since the U-phase operation, the V-phase operation, and the W-phase operation are the same, the U-phase operation will be described herein. In the drawing, two clock signals PCL and SDC, the direction index RI, the excitation interval signal Eu, the multiplied value Mu, the sign index signal Pu, the count value CM1 of the counter 501, the output S1 of the counter 501, the output S2 of the EXOR circuit 511, and the drive signals DRVA1 to DRVA4 from the drive waveform former 521 are shown. The counter 501 repeatedly performs an operation of counting down the count value CM1 up to 0 in synchronization with the clock signal PCL every period of the clock signal SDC. The initial value of the count value CM1 is set to the multiplied value Mu. For the purpose of convenient drawing, a negative value is also shown as the multiplied value Mu in FIG. 15, but the absolute value |Mu| thereof is used in the counter 501. The output 51 of the counter 501 is set to the H level when the count value CM1 is not zero, and goes down to the L level when the count value CM1 is zero.

The EXOR circuit 511 outputs the signal S2 representing the exclusive OR of the sign index signal Pu and the direction index RI. When the motor normally rotates, the direction index RI is at the L level. Accordingly, the output S2 of the EXOR circuit 511 is the same signal as the sign index signal Pu. The drive waveform former 521 generates the drive signals DRVA1 to DRVA4 from the output S1 of the counter 501 and the output S2 of the EXOR circuit 511. That is, among the output S1 of the counter 501, the signal in the period in which the output S2 of the EXOR circuit 511 is at the L level is output as the first and second drive signals DRVA1 and DRVA2 and the signal in the period in which the output S2 is at the H level is output as the third and fourth drive signals DRVA3 and DRVA4. In the vicinity of the right end of FIG. 15, the excitation interval signal Eu goes down to the L level, whereby a non-excitation interval NEP is set. Accordingly, in the non-excitation interval NEP, any of the drive signals DRVA1 to DRVA4 is not output and a high-impedance state is maintained.

Figure 16:
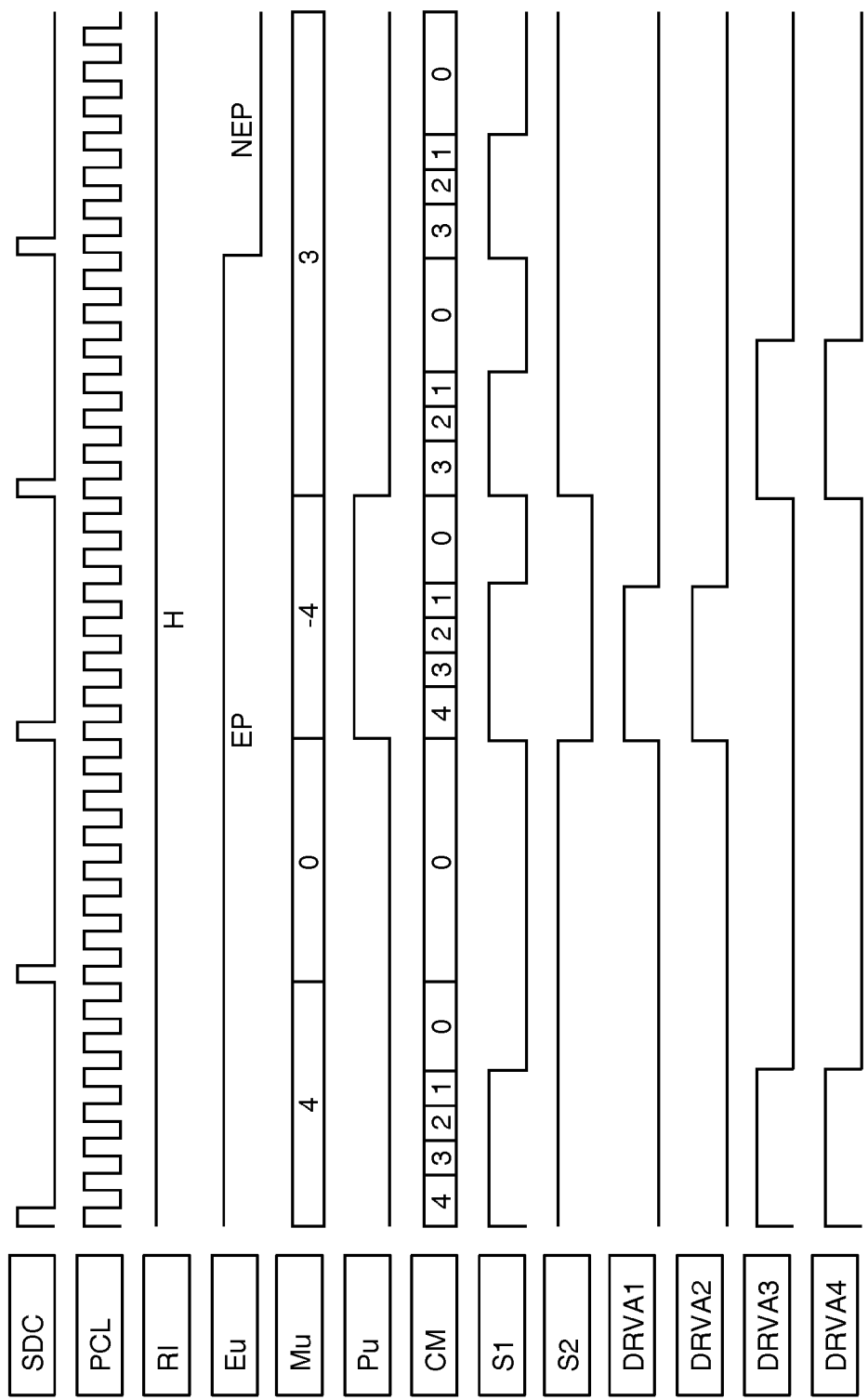
FIG. 16 is a timing diagram illustrating the operation of the PWM unit at the time of the reverse rotation of the motor.

FIG. 16 is a timing diagram illustrating the operation of the PWM unit 500 at the time of the reverse rotation of the motor. When the motor reversely rotates, the direction index RI is set to the H level. As a result, the first and second drive signals DRVA1 and DRVA2 and the third and fourth drive signals DRVA3 and DRVA4 are inverted from the states shown in FIG. 15. As a result, it can be understood that the motor reversely rotates. The same operation is performed in the V-phase circuits 502, 512, and 522 and the W-phase circuits 503, 513, and 523 of the PWM unit 500.

Figure 17A:
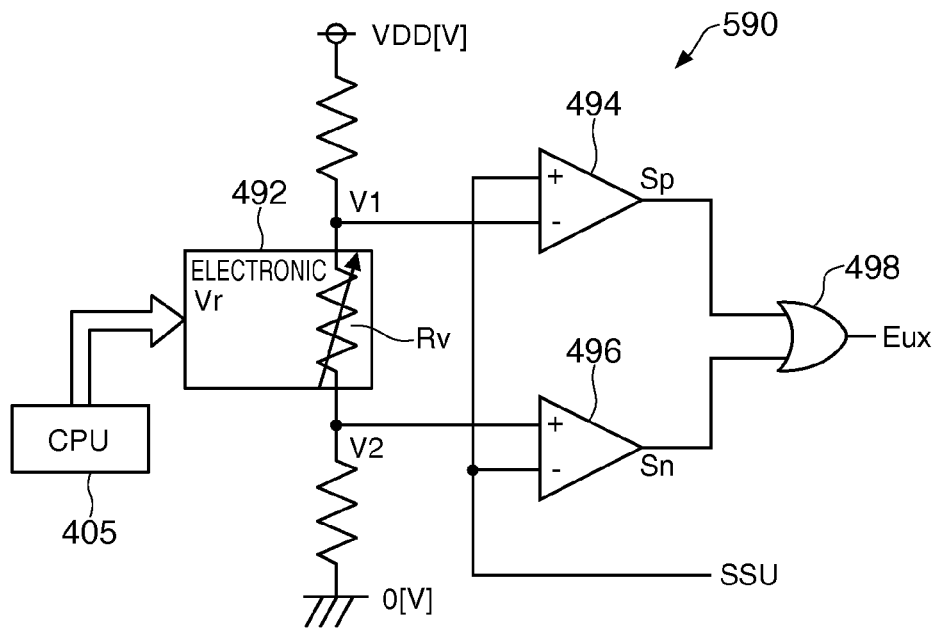
FIGS. 17A and 17B are diagrams illustrating the internal configuration and the operation of an excitation interval setting unit.
Figure 17B:
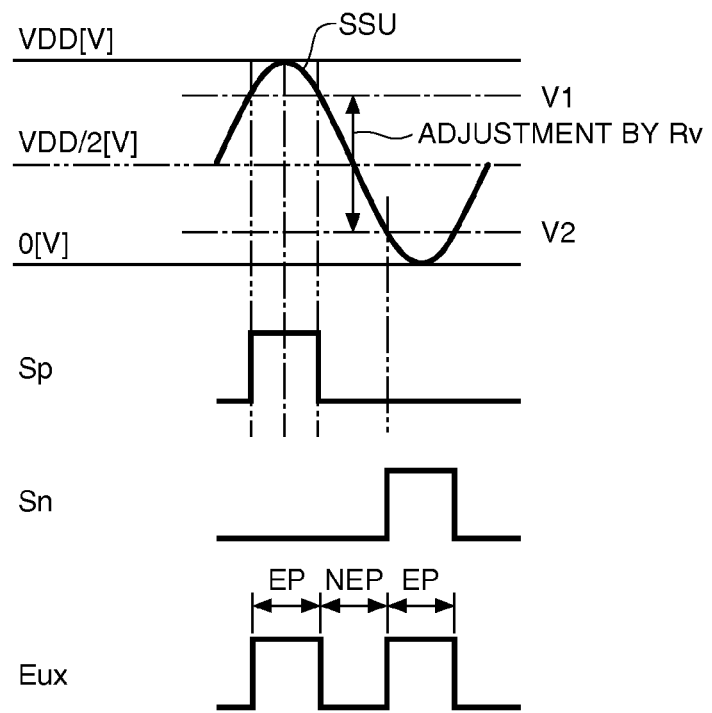

FIGS. 17A and 17B are diagrams illustrating the internal configuration and the operation of the excitation interval setting unit 590. The excitation interval setting unit 590 includes an electronic variable resistor 492, voltage comparators 494 and 496, and an OR circuit 498. The resistance value Rv of the electronic variable resistor 492 is set by the CPU 405. The voltages V1 and V2 at both ends of the electronic variable resistor 492 are supplied to input terminals of the voltage comparators 494 and 496, respectively. The sensor output SSU is supplied to the other input terminals of the comparators 494 and 496, respectively. In FIGS. 17A and 17B, the V-phase and W-phase circuits are not shown for the purpose of convenient drawing. The output signals Sp and Sn of the voltage comparators 494 and 496 are input to the OR circuit 498. The output of the OR circuit 498 is an excitation interval signal Eux for distinguishing the excitation interval from the non-excitation interval. The excitation interval signal Eux is sent to the CPU 405. The CPU 405 determines the advance angle of the excitation interval signal Eu with reference to the control table 840 on the basis of the length of the excitation interval signal Eux and the control signals from the torque-changing operation lever 810, the accelerator pedal 820, and the brake pedal 830 (see FIG. 13). When the advance angle is not promoted, the excitation interval signals Eu and Eux are the same signal.

FIG. 17B shows the operation of the excitation interval setting unit 590. The voltages V1 and V2 at both ends of the electronic variable resistor 492 are changed by adjusting the resistance value Rv. Specifically, the differences of the voltages V1 and V2 at both ends from the median value (=VDD/2) of the voltage range are set to the same value. When the sensor output SSU is higher than the first voltage V1, the output Sp of the first voltage comparator 494 becomes the H level. On the other hand, when the sensor output SSU is lower than the second voltage V2, the output Sn of the second voltage comparator 496 becomes the H level. The excitation interval signal Eux is a signal of the logical sum of the output signals Sp and Sn. Accordingly, as shown in the low part of FIG. 17B, the excitation interval signal Eux can be used as a signal representing the excitation interval EP and the non-excitation interval NEP. The excitation interval EP and the non-excitation interval NEP are set by causing the CPU 405 to adjust the variable resistance value Rv.

Figure 18:
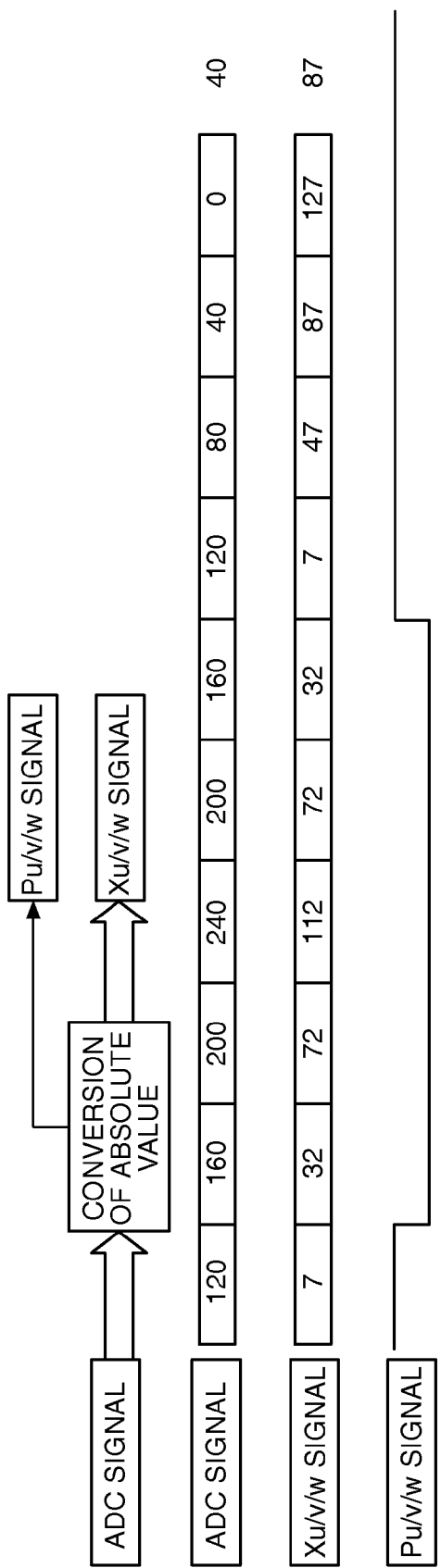
FIG. 18 is a diagram illustrating the operation and the timing of an encoder.

FIG. 18 is a diagram illustrating the operation and the timing of the encoder. Here, the U-phase encoder 460 (see FIG. 13) is described as an example. The encoder 460 receives an ADC signal from the AD converter 470 (see FIG. 13) and generates the sensor output value Xu and the sign index signal Pu. Here, the sensor output value Xu is obtained by shifting the ADC signal in the range of +127 to −128 and taking the absolute value thereof. Regarding the sign index signal Pu, the sign index signal Pu is set to H when the value of the ADC signal is smaller than 0, and the sign index signal Pu is set to L when the value of the ADC signal is greater than 0. The plus and minus of the sign index signal Pu may be inverted.

Figure 19A:
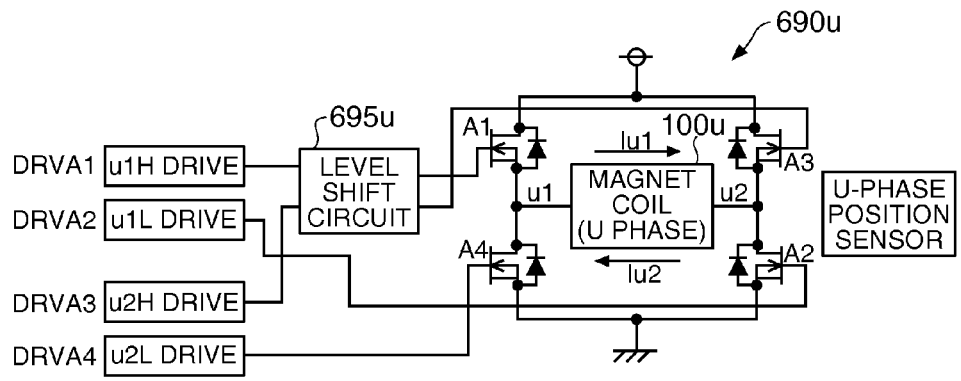
FIGS. 19A, 19B, and 19C are diagrams illustrating a three-phase driving circuit and a magnet coil.
Figure 19B:
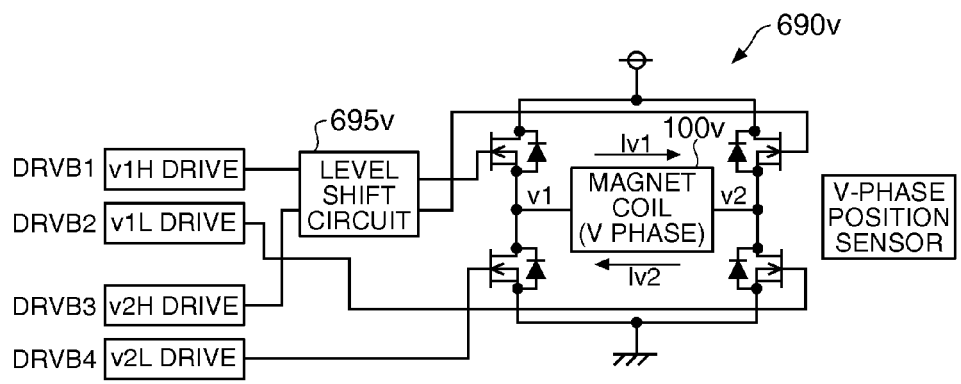
Figure 19C:
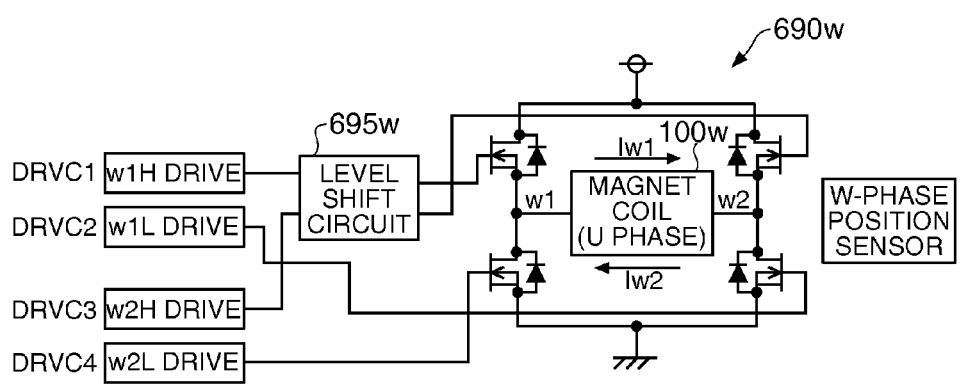

FIGS. 19A, 19B, and 19C are diagrams illustrating a three-phase driving circuit and a magnet coil. The three-phase driving circuit 690 includes a U-phase driving circuit 690u, a V-phase driving circuit 690v, and a W-phase driving circuit 690w. The configurations of the driving circuits 690u to 690w are the same and thus the U-phase driving circuit 690u is representatively described. The U-phase driving circuit 690u is an H-shaped bridge circuit and drives the U-phase magnet coil 100u on the basis of the drive signals DRVA1 to DRVA4. In this embodiment, a level shift circuit 695u is connected to the gates of transistors A1 and A3 connected to the power source. The level shift circuit 695u is used to raise the gate potentials of the transistors A1 and A3 higher than the source potential VS. Even when the transistor A1 is turned on, the potential of the terminal u1 is raised to only the gate potential—the threshold value of the transistor A1. Accordingly, when the gate potential and the drain potential are equal to each other, a so-called threshold drop is caused. When the gate potential of the transistor A1 is raised to be equal to or higher than the source voltage VS+ the threshold of the transistor A1 by the use of the level shift circuit 695u, the potential of the terminal u1 can be raised to the source potential VS at the time of turning on the transistor A1. The level shift circuit 695u may not be used. When a P-channel transistor is used as the transistor A1, the level shift circuit 695u may not be used. The same is true of the transistor A3. The arrow denoted by reference sign Iu1 represents the direction of the current flowing in the magnet coil 100u when the drive signals DRVA1 and DRVA2 are in the ON state. The arrow denoted by reference signal Iu2 represents the direction of the current flowing in the magnet coil 100u when the drive signals DRVA3 and DRVA4 are in the ON state. The same is true of the V-phase driving circuit 690v and the W-phase driving circuits 690w.

FIGS. 20A and 20B are diagrams illustrating the ON and OFF states of the drive signals and the operation of the magnet coil. Here, the U phase is representatively described. The same is true of the V phase and the W phase. In the example shown in FIG. 20A, the drive signals DRVA1 and DRVA2 are synchronized with each other and the drive signals DRVA3 and DRVA4 are synchronized with each other. In the period in which the drive signals DRVA1 and DRVA2 are in the ON state, a current flows in the positive direction (the direction denoted by reference sign Iu1 in FIG. 19A) in the magnet coil 100u. In the period in which the drive signals DRVA3 and DRVA4 are in the ON state, a current flows in the negative direction (the direction denoted by reference sign Iu2 in FIG. 19A) in the magnet coil 100u. In the period in which the drive signals DRVA1 to DRVA4 are in the ON state, the impedance is high (HiZ).

On the other hand, in the example shown in FIG. 20B, the drive signal DRVA2 is normally in the On state in the period in which the drive signal DRVA1 is in the ON state, and the drive signal DRVA4 is normally in the ON state in the period in which the drive signal DRVA3 is in the ON state. In this case, similarly, in the period in which both the drive signals DRVA1 and DRVA2 are in the ON state, a current flows in the positive direction (the direction denoted by reference sign Iu1 in FIG. 19A) in the magnet coil 100u. In the period in which both the drive signals DRVA3 and DRVA4 are in the ON state, a current flows in the negative direction (the direction denoted by reference sign Iu2 in FIG. 19A) in the magnet coil 100u. In this way, when the drive signals DRVA2 and DRVA4 driving the transistors A2 and A4 on the ground side are normally in the ON state in the period, current can be made to flow by the inductive electromotive force due to the excited magnet coil even in the period in which the transistors A1 and A3 are turned off, thereby enhancing the torque.

FIG. 21 is a diagram illustrating the connections of the magnet coils of the respective phases. In this embodiment, plural magnet coils 100u, 100v, and 100w are provided to each phase. The magnet coils 100u, 100v, and 100w are connected in series in each phase. By the connection in series, it is possible to reduce the current. The magnet coils 100u, 100v, and 100w may be connected in parallel. By the connection in parallel, the voltages applied to the magnet coils 100u, 100v, and 100w can be raised, thereby enhancing the output.

Figure 22:
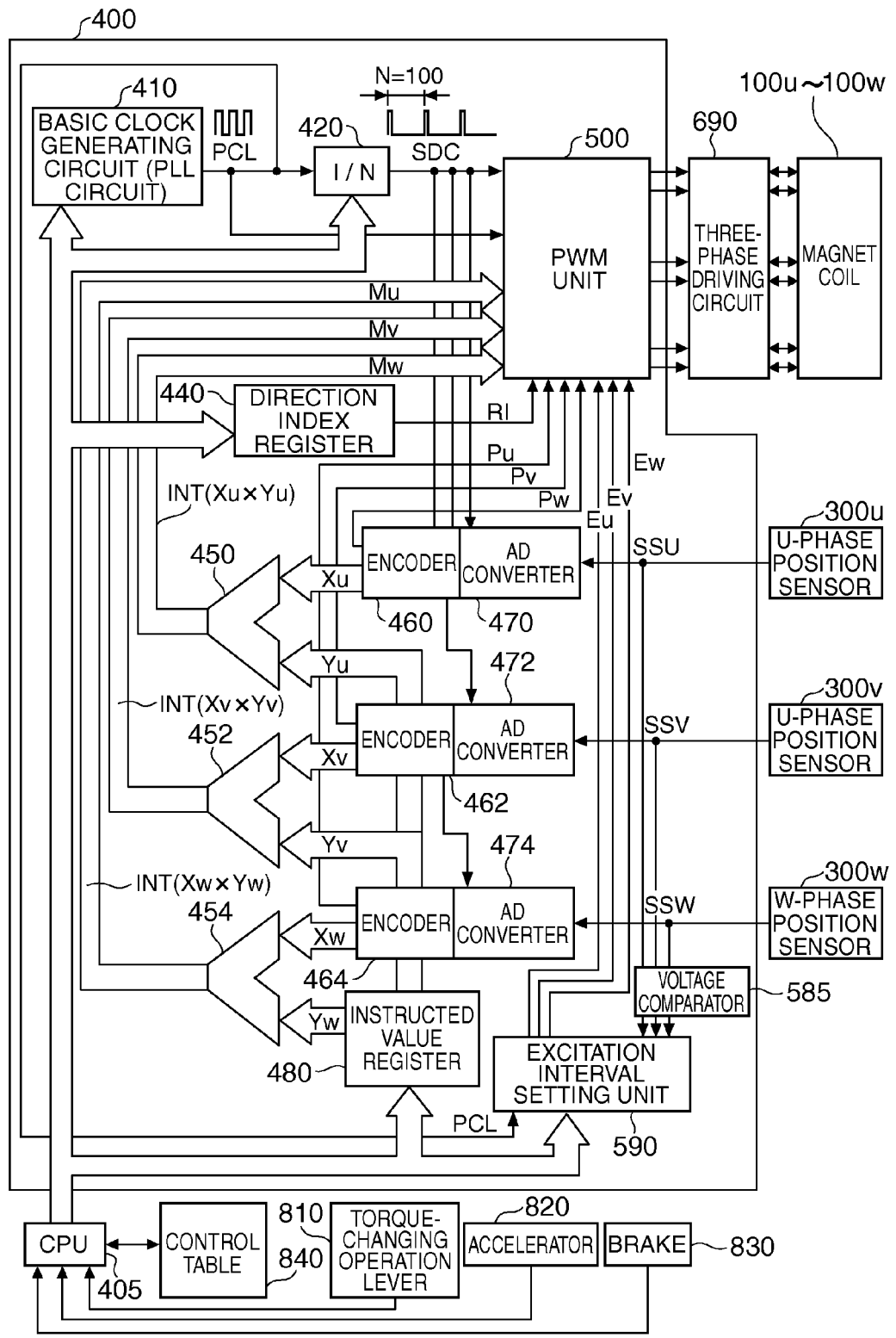
FIG. 22 is a diagram illustrating the configuration of the PWM controller when the advance angle control is performed.

FIG. 22 is a diagram illustrating another configuration of the PWM controller when the advance angle control is performed. The configuration shown in FIG. 22 is substantially the same as shown in FIG. 13, except that the internal configuration of the excitation interval setting unit 590 is changed, a voltage comparator 585 is disposed between the position sensors 300u to 300w and the excitation interval setting unit 590, and the clock signal PCL is input to the excitation interval setting unit 590, as described later.

Figure 23:
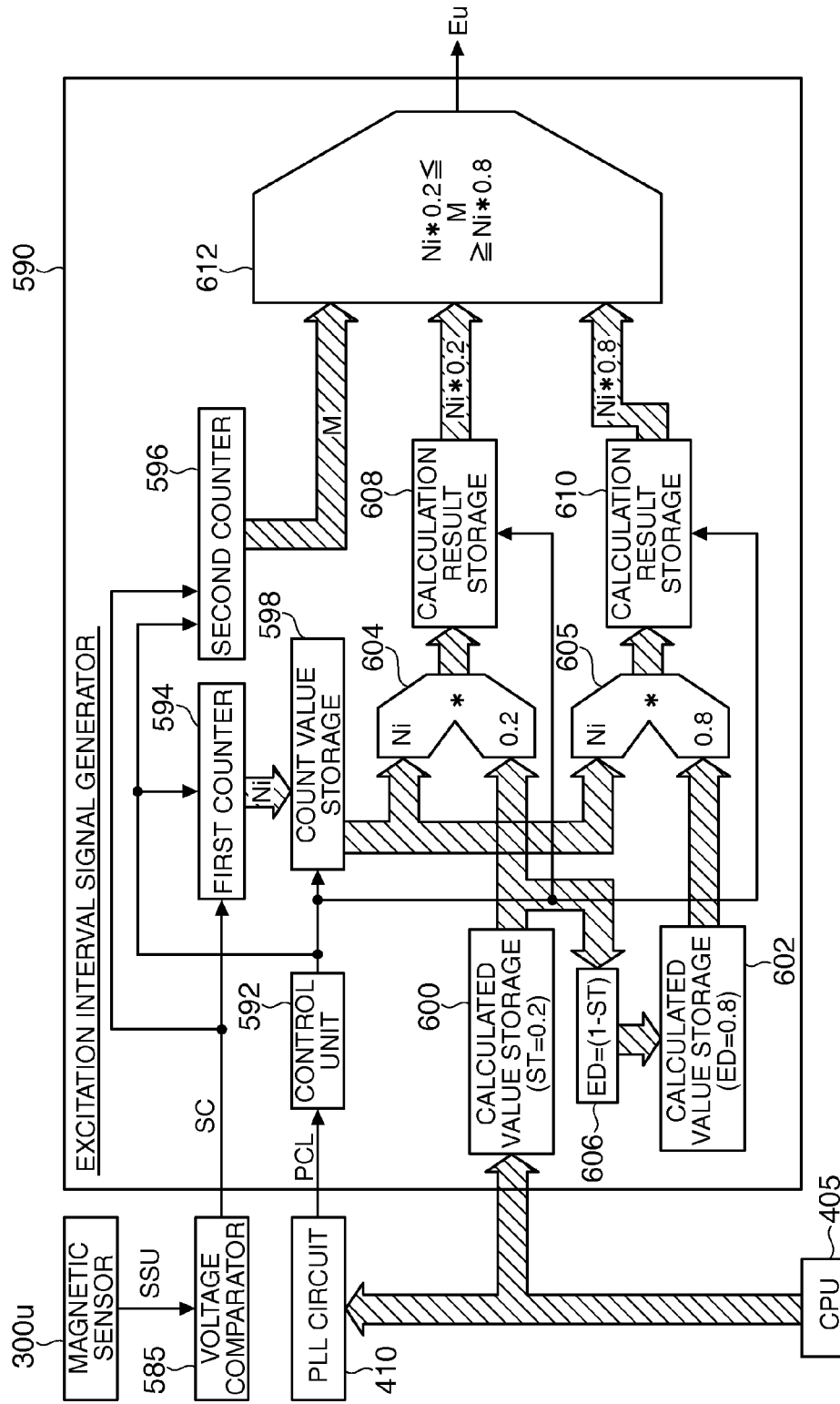
FIG. 23 is a block diagram illustrating the configuration of the excitation interval setting unit.

FIG. 23 is a block diagram illustrating the configuration of the excitation interval setting unit 590. In FIG. 23, a magnetic sensor 300u, a voltage comparator 585, a PLL circuit 410, and a CPU 405 are shown in addition to the excitation interval setting unit 590. Here, the U phase is representatively described, but the same is true of the V phase and the W phase. The excitation interval setting unit 590 includes a controller 592, a first counter 594, a second counter 596, a count value storage 598, and two calculated value storages 600 and 602. The excitation interval setting unit 590 further includes two multiplication circuits 604 and 605, a calculation circuit 606, two calculation result storages 608 and 610, and a comparison circuit 612. The PLL circuit 510 generates a clock signal PCL used in the excitation interval setting unit 590. The controller 592 supplies the clock signal PCL to the counters 594 and 596 and supplies appropriate latch timing to the count value storage 598 or the calculation result storages 608 and 610. The elements operate as follows. An example wherein an advance angle is not promoted will be first described and then an example where the advance angle is promoted will be described.

Figure 24:
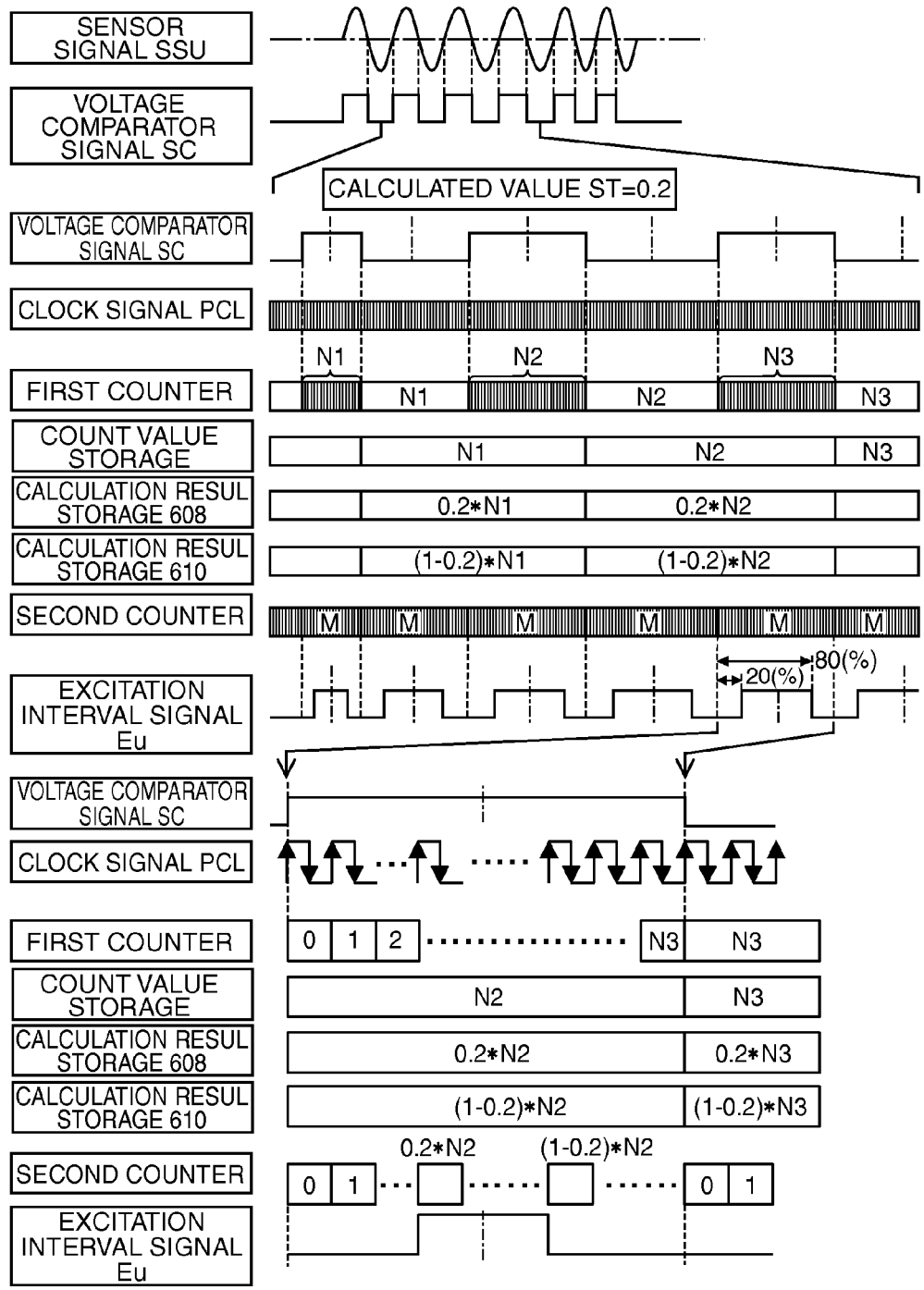
FIG. 24 is a timing diagram illustrating the operation of the excitation interval setting unit.

FIG. 24 is a timing diagram illustrating the operation of the excitation interval setting unit 590. First, the voltage comparator 585 compares the signal SSU (analog) from the magnetic sensor 300u with a reference signal (not shown) and generates a voltage comparator signal SC which is a digital signal. The level of the reference signal is preferably set to a median value of the level which can be taken by the sensor signal SSU. The first counter 594 counts the number of clocks in the period in which the voltage comparator signal SC is at the high level on the basis of the clock signal PCL supplied from the controller 592. That is, the first counter 594 starts counting when the voltage comparator signal SC is changed from the low level to the high level, and stores the count value Ni (where i represents the period number) in the count value storage 598 when the voltage comparator signal SC is changed to the low level. The first counter 594 resets the internal count value Ni to 0 when the voltage comparator signal SC is changed to the high level again in the next period, and counts the number of clocks in the period in which the voltage comparator signal SC is at the high level as a count value N(i+1) again. The first counter 594 overwrites the count value N(i+1) to the count value storage 598 when the voltage comparator signal SC is changed to the low level.

The first calculated value storage 600 (see FIG. 23) stores the calculated value ST set by the CPU 405. In the examples shown in FIGS. 23 and 24, the calculated value is set to ST=0.2. The calculation circuit 606 subtracts the calculated value ST stored in the calculated value storage 600 from 1 and stores the obtained calculation result (calculated value ED=1−ST) in the second calculated value storage 602. The first multiplication circuit 604 multiplies the calculated value ST stored in the first calculated value storage 600 by the count value Ni stored in the count value storage 598 and stores the obtained calculation result (=Ni×ST) in the first calculation result storage 608. The second multiplication circuit 605 multiplies the calculated value ED stored in the second calculated value storage 602 by the count value Ni stored in the count value storage 598 and stores the obtained calculation result (=Ni×ED) in the second calculation result storage 610.

On the basis of the clock signal PCL supplied from the controller 592, the second counter 596 starts counting the number of clocks when the voltage comparator signal SC is changed to the high level, and ends the counting when the voltage comparator signal SC is changed to the low level. The counter is reset to 0, starts counting the number of clocks when the voltage comparator signal SC is changed to the low level, and ends the counting when the voltage comparator signal SC is changed to the high level. The count value M is sequentially input to the comparison circuit 612.

The comparison circuit 612 is a window comparator generating and outputting the excitation interval signal Eu. That is, the second count value M sequentially input from the second counter 596 is compared with the calculation result (=Ni×ST) stored in the first calculation result storage 608 and the excitation interval signal Eu is set to the high level when both are equal to each other. The second count value M sequentially input from the second counter 596 is compared with the calculation result (=Ni×ED) stored in the second calculation result storage 610 and the excitation interval signal Eu is set to the low level when both are equal to each other. In the period in which the voltage comparator signal SC is at the low level, the excitation interval signal Eu is output in the same way as described above.

Figure 25:
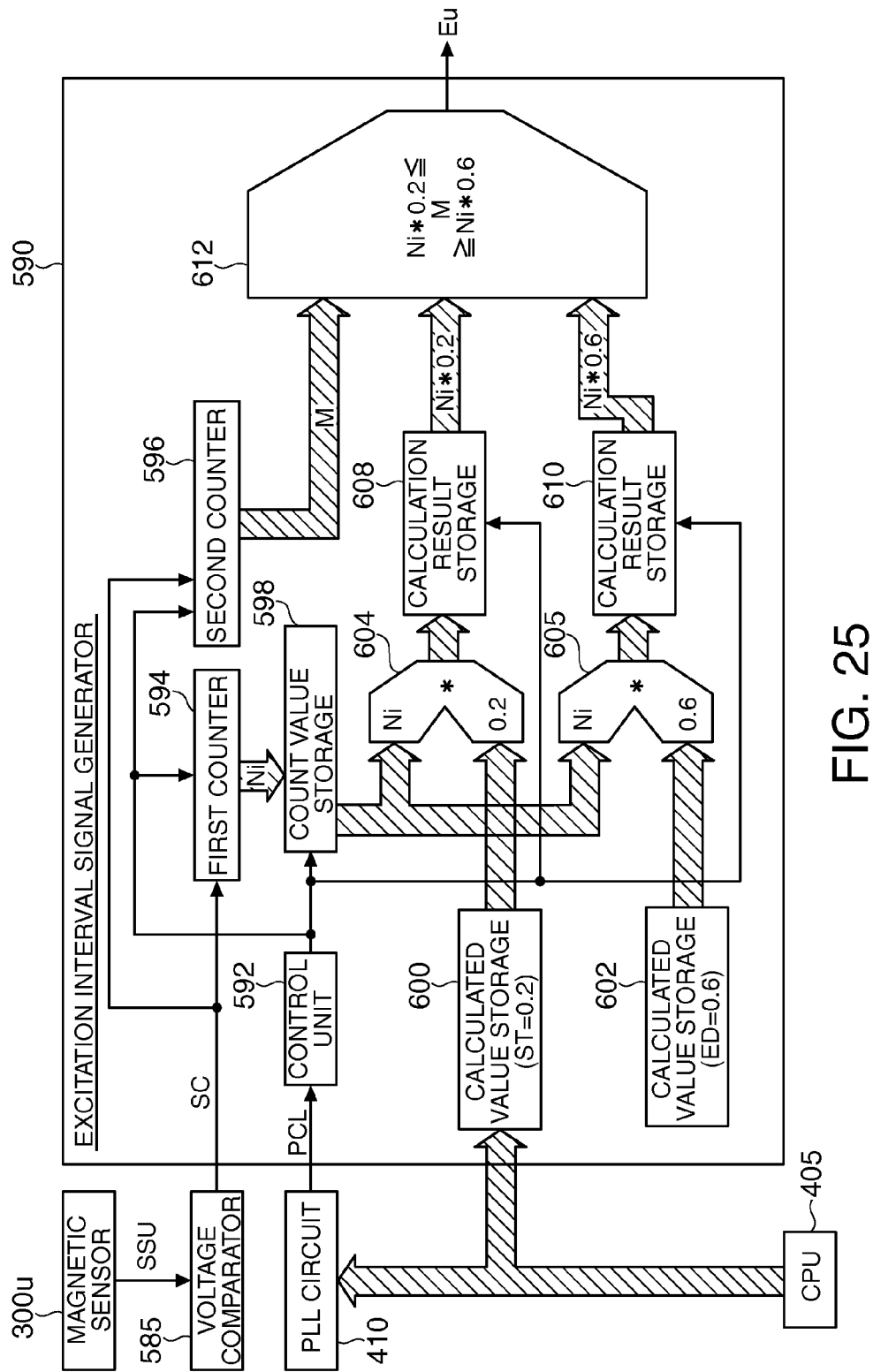
FIG. 25 is a diagram illustrating an example where an advance angle is promoted.

FIG. 25 is a diagram illustrating an example where the advance angle is promoted. This configuration is the same as shown in FIG. 23, except that the value of the calculated value ED stored in the calculated value storage 602 is set to a value independent of the calculated value ST.

Figure 26:
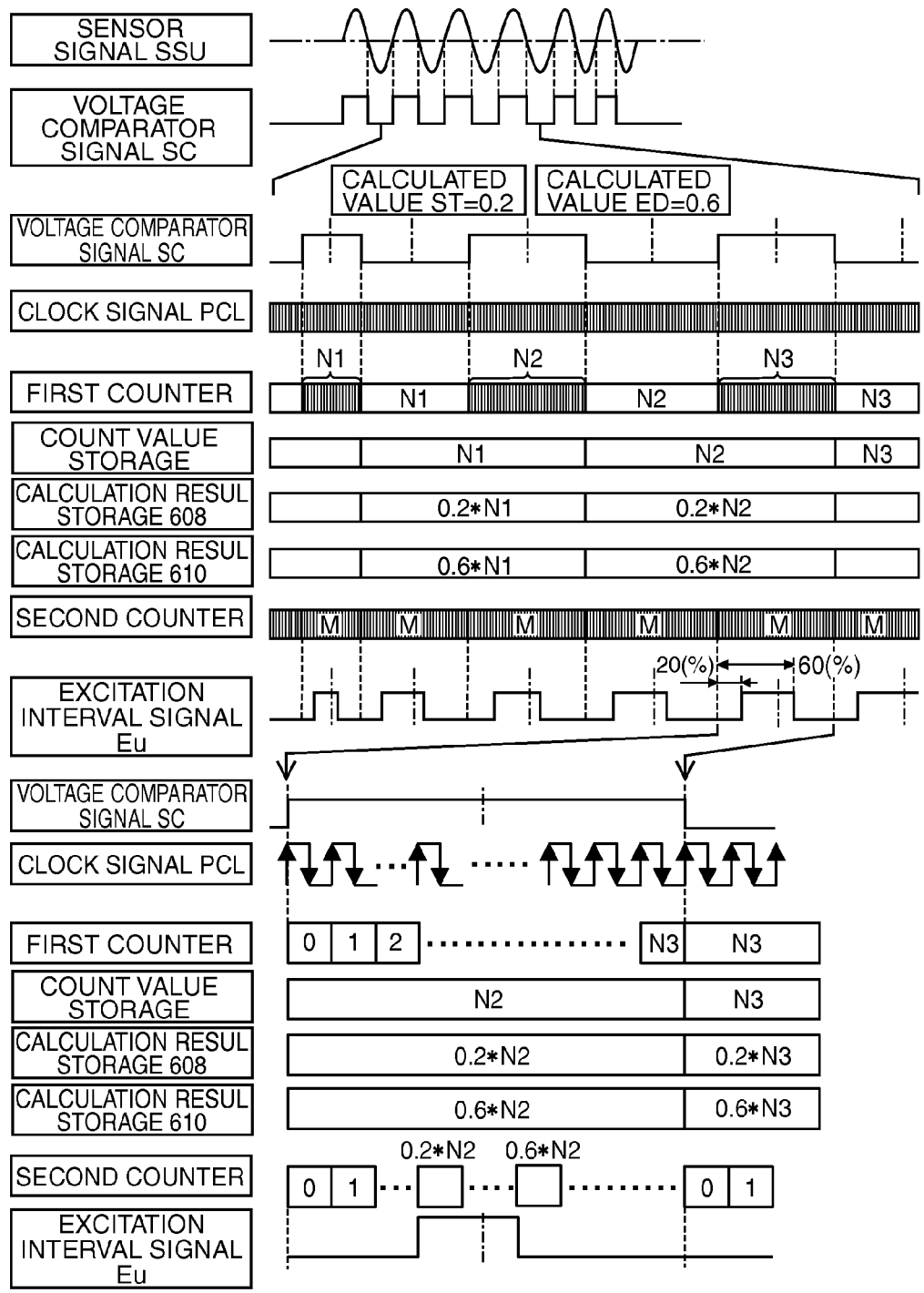
FIG. 26 is a timing diagram illustrating an example of the operation of the excitation interval setting unit.

FIG. 26 is a timing diagram illustrating an example of the operation of the excitation interval setting unit 590. This configuration is the same as shown in FIG. 24, except that the calculated value ED is set to 0.6 by the CPU 405 and the median position of the excitation interval EP of the excitation interval signal Eu is put earlier than the median position of the high-level period of the voltage comparator signal SC by setting the calculated value ED to 0.6.

Figure 27:
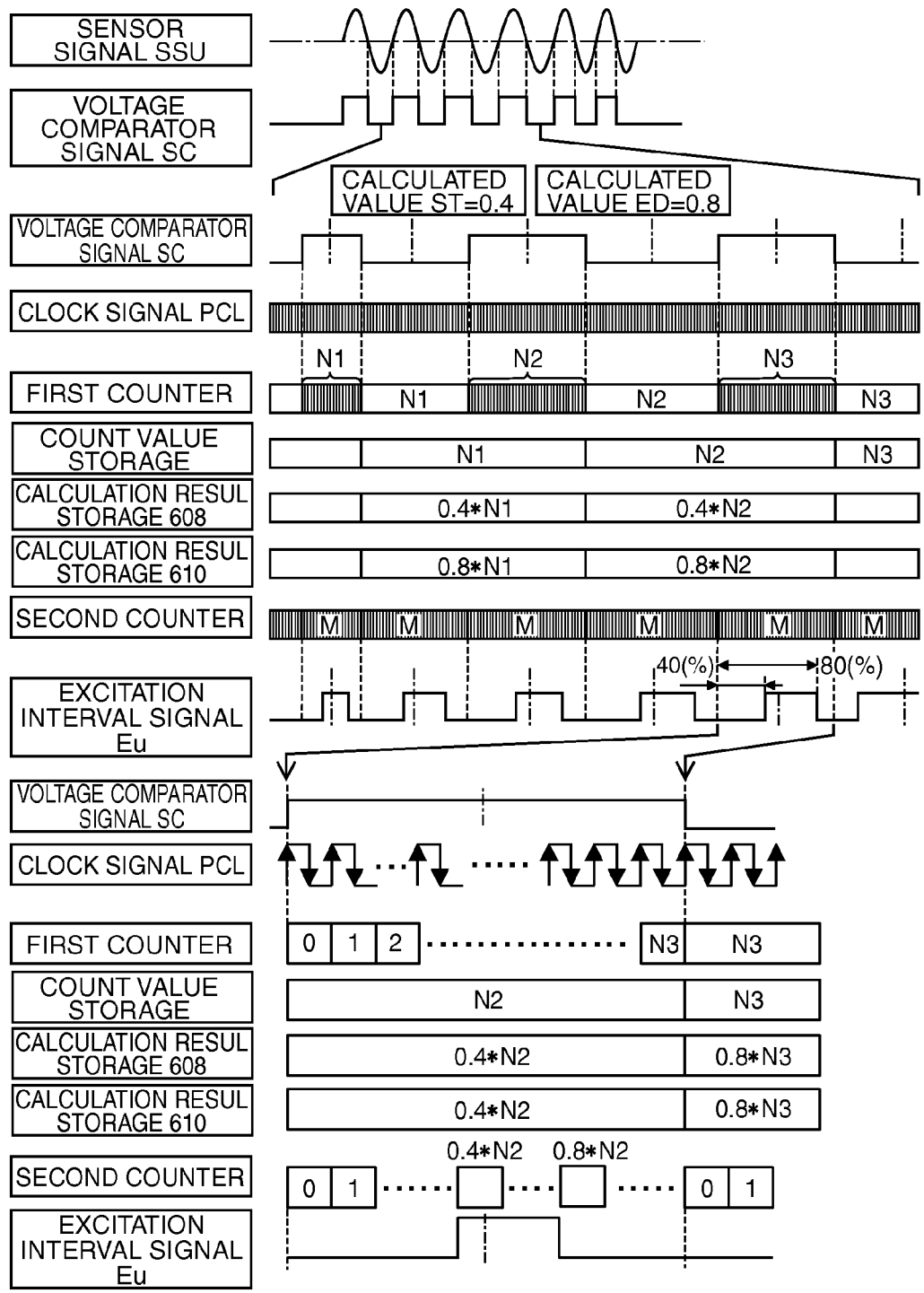
FIG. 27 is a timing diagram illustrating another example of the operation of the excitation interval setting unit.

FIG. 27 is a timing diagram illustrating another example of the operation of the excitation interval setting unit 590. This configuration is the same as shown in FIG. 26, except that the calculated value ST is set to 0.4, the calculated value ED is set to 0.8, and the median position of the excitation interval EP of the excitation interval signal Eu is put later than the median position of the high-level period of the voltage comparator signal SC.

As described above, when the calculated value ST and the calculated value ED are arbitrarily set by the CPU 405, it is possible to arbitrarily set the phase (the temporal width and the temporal position) of the excitation interval EP. It is preferable that the CPU 405 sets the calculated value ST and the calculated value ED with reference to the control table 840 on the basis of the control signals from the torque-changing operation lever 810, the accelerator pedal 820, and the brake pedal 830. Then, even when the phases of the first and second PWM signals PWM1 and PWM2 are not advanced, it is possible to perform the advance angle control of advancing the phases of the first and second drive signals DRVA1 and DRVA2 only by advancing the temporal position of the excitation interval EP. Similarly to the advance control, it may be possible to perform a delay control.

According to the above-mentioned embodiment, the CPU 405 performs the first torque control of setting the excitation interval signals Eu to Ew exciting the magnet coils 100 and the second torque control changing the duty ratios of the drive signals of the magnet coils 100 with respect to the phases in which the maximum counter-electromotive force is generated in the magnet coils 100 (100u to 100w). The CPU 405 performs the advance angle control of putting the value of the median phase of the excitation interval signals Eu to Ew earlier than the value of the phase in which the maximum counter-electromotive force is generated in the magnet coils 100 at the time of performing the first torque control, and changes the duty ratio so that the gain is greater than 100%, where the gain in the sine wave is 100%, at the time of performing the second torque control, thereby efficiently controlling the motor.

In this embodiment, the magnitude of the advance angle in the advance angle control is set to be greater as the length of the excitation interval signals Eu to Ew becomes smaller. The motor 10 can rotate at a high speed in the period in which the length of the excitation interval signal Eu to Ew is small.

In this embodiment, when the motor rotates at a high speed, the CPU 405 performing a control of narrowing the excitation interval signals Eu to Ew in the first torque control, whereby a low torque and a high-speed rotation are possible. The CPU 405 performs a control of widening the excitation interval signals Eu to Ew in the first torque control at the time of starting up the motor, whereby the motor is started up with a high torque. In addition, the CPU 405 performs a control of widening the excitation interval signals Eu to Ew in the first torque control at the time of acceleration, whereby the motor can be easily accelerated with a high torque. Since the CPU 405 includes the control table 840 used for the control, it is possible to easily set the widths or the magnitude of the advance angle of the excitation interval signals Eu to Ew.

Second Embodiment

Figure 28:
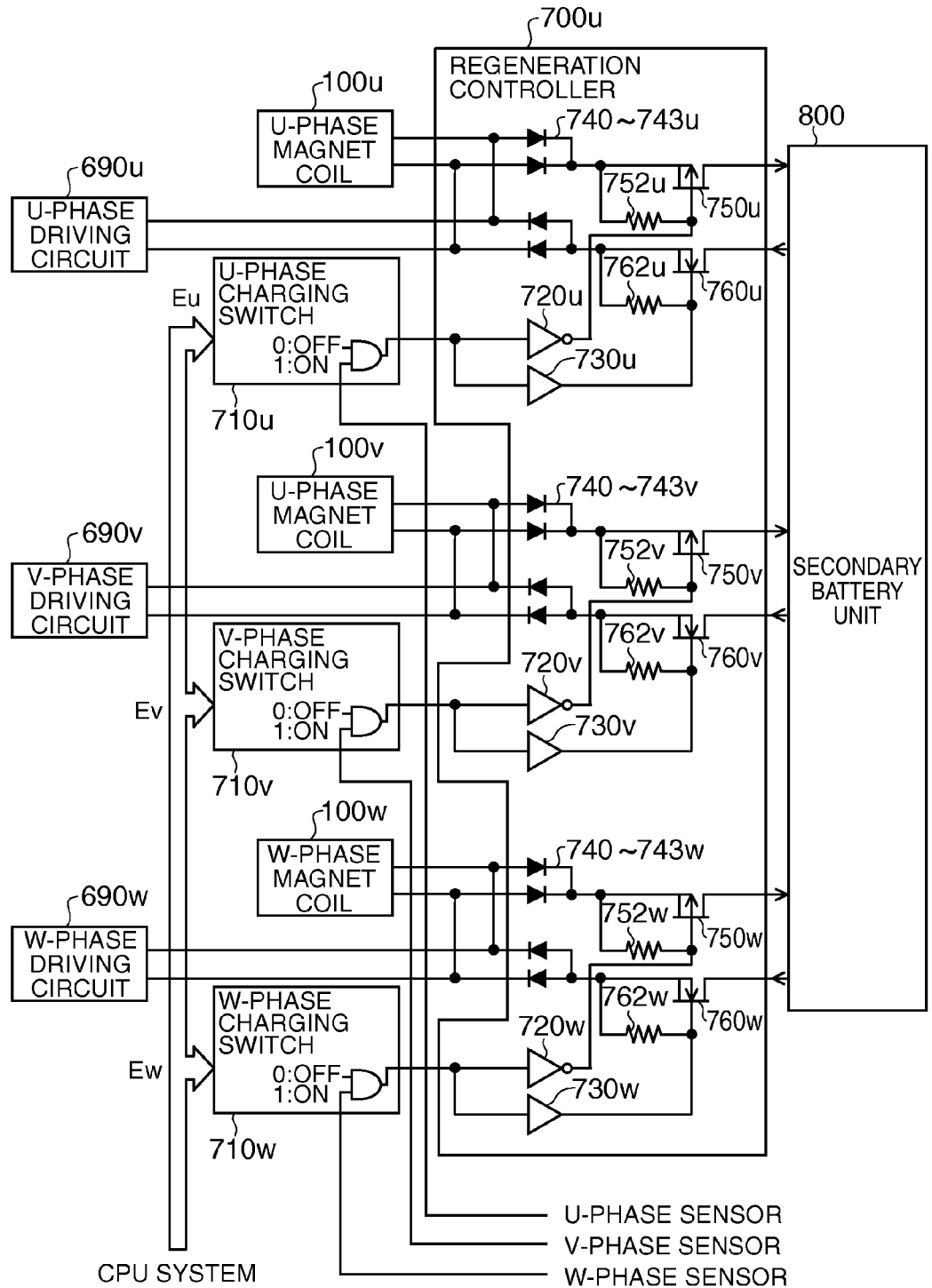
FIG. 28 is a diagram illustrating a second embodiment of the invention.

FIG. 28 is a diagram illustrating a second embodiment of the invention. In the second embodiment, a regeneration control from the motor 10 (not shown) is performed. In the second embodiment, the control circuit block includes a regeneration controller 700, a U-phase charging switch 710u to a W-phase charging switch 710w, and a secondary battery unit 800. The regeneration controller 700 includes a U-phase regeneration control circuit 700u, a V-phase regeneration control circuit 700v, and a W-phase regeneration control circuit 700w. The configurations of the U-phase regeneration control circuit 700u, the V-phase regeneration control circuit 700v, and the W-phase regeneration control circuit 700w are the same and thus the U-phase regeneration control circuit 700u will be representatively described. The U-phase regeneration control circuit 700u is connected in parallel to the U-phase driving circuit 690u with respect to the U-phase magnet coil 100u. The U-phase regeneration control circuit 700u includes an inverter circuit 720u, a buffer circuit 730u, rectifier circuits 740u to 743u formed of a diode, switching transistors 750u and 760u, and resistors 752u and 762u.

When the excitation interval signal Eu is in the ON state and the brake pedal 830 is pressed, the U-phase charging switch 710u is turned on (=1=H). At this time, as the pedaling force of the brake pedal 830 increases, that is, as the deceleration increases, the ON period of the excitation interval signal Eu may be set to increase. When the U-phase charging switch 710u is turned on, the output of the inverter circuit 720u is changed to L and the switching transistor 750u is turned on. On the other hand, since the output of the buffer circuit 730u is changed to H, the switching transistor 760u is turned off. Then, the motor can regenerate the power generated in the U-phase magnet coil 100u via the switching transistor 750u and can charge the secondary battery unit 800. On the contrary, when the U-phase charting switch 710u is turned off (=0=L), the switching transistor 760u is turned on by the buffer circuit 730u. On the other hand, the output of the inverter circuit 720u is changed to H and the switching transistor 750u is turned off. In this case, it is possible to supply a current to the U-phase magnet coil 100u from the secondary battery unit 800.

In this embodiment, when the brake pedal 830 is pressed, the CPU 405 turns on the U-phase charging switch 710u. However, when the pedaling force of the accelerator pedal is released to require an engine brake, the U-phase charging switch 710u may be turned on to perform the regenerative braking operation and the regeneration of kinetic energy.

The CPU 405 can increase the regeneration energy by performing the control of widening the excitation interval signal Eu in the first torque control to regenerate the energy as the deceleration increases at the time of the deceleration of the motor, and can perform the control of narrowing the excitation interval signal Eu as the deceleration decreases, thereby suppressing an unpleasant feeling due to the rapid deceleration.

MODIFICATIONS

Figure 29:
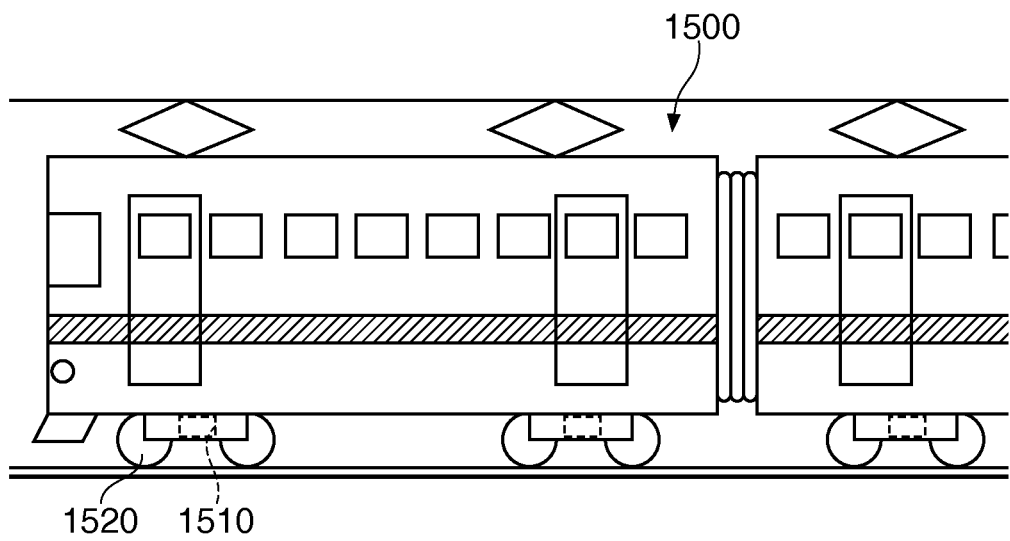
FIG. 29 is a diagram illustrating a railway vehicle employing a motor according to a modification of the invention.

The motor according to the invention can be used as a motor for a moving object or a robot. FIG. 29 is a diagram illustrating a railway vehicle employing the motor according to a modification of the invention. The railway vehicle 1500 includes motors 1510 and wheels 1520. The motors 1510 drive the wheels 1520. The motors 1510 are used as a power generator at the time of braking the railway vehicle 1500 to regenerate the power. Various brushless motors can be used as the motors 1510.

While the embodiments of the invention has been described with reference to several examples, the embodiments of the invention are not intended to limit the invention but are intended to facilitate the understanding of the invention. The invention can be modified in various forms without departing from the concept of the invention and the scope of the appended claims. The invention also includes equivalents thereof.

The present application claims the priority based on Japanese Patent Application No. 2010-120303 filed on May 26, 2010, the disclosure of which is hereby incorporated by reference in its entirety.

What is claimed is:

1. An electromechanical device comprising:
a magnet coil;
a PWM driving circuit that supplies a PWM drive signal to the magnet coil; and
a control unit that controls the PWM driving circuit,
wherein the control unit performs a first control of setting an excitation interval which is an interval in which the PWM drive signal is supplied to the magnet coil and a second control of changing a duty ratio of the PWM drive signal, and
wherein the control unit performs an advance angle control of putting the phase of the center of the excitation interval earlier than the phase in which a counter-electromotive force generated in the magnet coil has the maximum value in the first control, and increases the duty ratio of the PWM drive signal in the second control so that a gain is greater than 100% when the gain is 100% at the time of generating the PWM drive signal so as to have a sinusoidal shape.

2. The electromechanical device according to claim 1, wherein the magnitude of an advance angle in the advance angle control is set to be greater as the length of the excitation interval becomes smaller.

3. The electromechanical device according to claim 1, wherein the control unit performs a control of further narrowing the excitation interval in the first control as the electromechanical device operates at a higher speed.

4. The electromechanical device according to claim 1, wherein the control unit regenerates energy while performing a control of widening the excitation interval in the first control as the deceleration increases at the time of decelerating the electromechanical device.

* * * * *